US011348338B2

(12) United States Patent
Chowdhury et al.

(10) Patent No.: US 11,348,338 B2
(45) Date of Patent: May 31, 2022

(54) METHODS AND SYSTEMS FOR CROWD MOTION SUMMARIZATION VIA TRACKLET BASED HUMAN LOCALIZATION

(71) Applicants: Tahmid Z Chowdhury, Surrey (CA); Kevin Cannons, Vancouver (CA); Mohammad Asiful Hossain, Burnaby (CA); Zhan Xu, Richmond (CA)

(72) Inventors: Tahmid Z Chowdhury, Surrey (CA); Kevin Cannons, Vancouver (CA); Mohammad Asiful Hossain, Burnaby (CA); Zhan Xu, Richmond (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 17/088,962

(22) Filed: Nov. 4, 2020

(65) Prior Publication Data

US 2022/0138475 A1   May 5, 2022

(51) Int. Cl.
*G06V 20/52*  (2022.01)
*G06K 9/62*  (2022.01)
*G06V 10/75*  (2022.01)

(52) U.S. Cl.
CPC .......... *G06V 20/53* (2022.01); *G06K 9/6232* (2013.01); *G06K 9/6277* (2013.01); *G06V 10/751* (2022.01)

(58) Field of Classification Search
None
See application file for complete search history.

(56) References Cited

U.S. PATENT DOCUMENTS 9,576,199 B2    2/2017  Dong et al.
2008/0118106 A1  5/2008  Kilambi et al.
(Continued)

FOREIGN PATENT DOCUMENTS

CN    106023262 A    10/2016
CN    107292908 A    10/2017
(Continued)

OTHER PUBLICATIONS

Dawkins, Calculus II—Polar Coodinates. (Year: 2018).*
Liang, R. et al.; Counting Crowd Flow Based on Feature Points; Neurocomputing, pp. 377-384 2014.
Hashemzadeh, M.; Counting Moving People In Crowds Using Motion Statistics of Feature-Points; vol. 72 pp. 453-487 2014.
(Continued)

*Primary Examiner* — Mohammed Rachedine

(57) ABSTRACT

A crowd motion summarization method that provides a rich, real-time description of the crowd's characteristics from a video, such as, speed, orientation, count, spatial locations, and time. A feature tracking module receives each video frame and detects features (feature points) from the video frame. A crowd occupancy detection module receives the video frame and generates a binary crowd occupancy map having human pixel positions which indicate the human location versus non-human location, and generates a total human count of humans detected in the video frame. The feature tracking module generates feature tracking information for only those features contained in the human pixel positions which indicate the human location. In an example, the detected features are Kanade-Lucas-Tomasi (KLT) features. A feature-crowd matching module generates, using the feature tracking information and the total human count: crowd motion data. The method outputs the crowd motion data.

20 Claims, 14 Drawing Sheets

(56) References Cited

U.S. PATENT DOCUMENTS

| | | | | |
|---|---|---|---|---|
| 2010/0322516 A1* | 12/2010 | Xu | ................... | G06V 20/53 382/173 |
| 2015/0178571 A1* | 6/2015 | Zhang | ................ | G06T 7/75 382/103 |
| 2016/0133025 A1* | 5/2016 | Wang | ................ | G06V 20/53 348/135 |
| 2017/0243078 A1* | 8/2017 | Loui | ................ | G06T 7/215 |
| 2020/0098112 A1 | 3/2020 | Tao et al. | | |

FOREIGN PATENT DOCUMENTS

| | | | | | |
|---|---|---|---|---|---|
| CN | 109389044 A | * | 2/2019 | ......... | G06K 9/00718 |
| CN | 110991267 A | * | 4/2020 | | |
| CN | 111191524 A | | 5/2020 | | |
| CN | 111611878 A | * | 9/2020 | | |
| CN | 109474889 B | * | 5/2021 | ......... | G06K 9/00778 |
| JP | 2018025831 A | | 2/2018 | | |

OTHER PUBLICATIONS

Patzold, Michael et al.; Counting People in Crowded Environments By Fusion of Shape and Motion Information; 2010 Seventh IEEE International Conference on Advanced Video and Signal Based Surveillance; pp. 157-164 2010.

Ryan, David et al.; Crowd Counting Using Gro up Tracking and Local Features; 2010 Seventh IEEE International Conference on Advanced Videoo and Signal Based Surveillance; pp. 218-224 2010.

Sidla, Oliver et al.; Pedestrian Detection and Tracking For Counting Applications in Crowded Situations; The Computer Society; Proceedings of the IEEE Intl Conf, on Video and Signal Based Surveillance; 6 pages 2006.

CN 107292908 Machine Translation of Abstract Oct. 24, 2017.

International Search Report, PCT Application No. PCT/CN2021/127882, dated Feb. 9, 2022.

* cited by examiner

Crowd Panic Detection

Crowd Moving in Wrong Direction Detection

Crowd Stampede Detection

METHODS AND SYSTEMS FOR CROWD MOTION SUMMARIZATION VIA TRACKLET BASED HUMAN LOCALIZATION

TECHNICAL FIELD

Example embodiments relate to video processing, for example crowd motion summarization of a video containing crowd motions.

BACKGROUND

Cameras can be used to capture videos of crowds. The videos can contain humans who are moving throughout the videos (some humans may be stationary). There is minimal work in the existing literature that combines information from crowd motion estimation and crowd counting. In rare cases where such a combination is considered, the main goal is to improve crowd count estimates by using motion information.

For example, in U.S. Pat. No. 9,576,199B2 to Zong et al., herein incorporated by reference, the inventors propose a method to compute the number and moving direction of pedestrians. They utilize Gaussian mixture modeling to remove static feature points and obtain a foreground pedestrian mask. Template maps around foreground feature points are tracked across frames to obtain a general trend of the crowd motion. A heuristic-based approach based on edge counting was used to count the number of pedestrians.

The background subtraction-based approach does not differentiate between crowds and other distractors within the scene that are moving such as cars, animals, and swaying trees. In addition, the formation of certain blobs by Zong et al. does not result in precise foreground/background binarization. As a result, the resulting crowd motion information and counting may not be representative of the true crowd statistics.

In Patent Application Publication No. US 2008/0118106 A1 to Kilambi et al., herein incorporated by reference, a crowd counting system is proposed that uses motion information. Kilambi et al. employ background subtraction to identify foreground moving regions; however, their method uses hand-crafted thresholds to differentiate between humans and other moving objects (e.g. vehicles). Kilambi et al. presented two additional modules within their system. The first module uses a Kalman filter to track individuals/groups of people, while the second module counts the number of people, whenever a foreground blob is sufficiently large. This count is achieved by projecting the foreground blob onto the ground plane and a second plane at the average height of a human. The blob is processed holistically with two assumptions to infer the count: 1) Humans move together with a fixed gap between adjacent members, and 2) The intersection of the projections onto the two planes is representative of the person count.

In addition to the limitations listed for Zong et al., the method of Kilambi et al. makes several assumptions to classify the blobs (crowds vs. other moving objects) and determine the counts within certain blobs. These assumptions are not realistic and result in numerous parameters that require optimization for each scene, making the approach infeasible and error-prone in real-world applications.

In Patzold et al.: Counting people in crowded environments by fusion of shape and motion information; 2010 7th IEEE International Conference on Advanced Video and Signal Based Surveillance, pages 157-164, IEEE, 2010, herein incorporated by reference, motion information is used for crowd counting in order to reduce the number of false positives. Specifically, Patzold et al. adopt a part-based detection technique that focuses only on detecting heads and shoulders, alleviating the occlusion issue to an extent. Patzold et al. state the advantage of this technique is that it relaxes the stringent assumption about the visibility of the entire human body. Their procedure fuses the spatial information of an adapted Histogram of Oriented Gradients (HOGs) based detector with temporal information by exploiting the distinctive motion characteristics of head-shoulder regions. Once the trajectories associated with a human are validated, they are used to identify the number of individuals in a scene.

Patzold et al. presumes that the head-shoulder regions are always visible, which will not be true in densely populated scenes nor for certain camera viewpoints. The head-shoulder requirement restricts the approach to a narrow range of deployment settings. Further, the motion signatures of the head-shoulder regions are localized using a hand-crafted binary template, which implicitly assumes the head/shoulder size and camera viewpoint. If the camera position were to change, the current template would be ineffective. This scene-specific template makes the approach unscalable and inflexible.

In Hashemzadeh et al.: Counting moving people in crowds using motion statistics of feature-points; Multimedia Tools and Applications, 72(1):453-487, 2014, herein incorporated by reference, the authors propose a trajectory-clustering-based technique for crowd counting. The technique detects independent motions by clustering interest points on people tracked over time. Hand-crafted features are extracted from each cluster and provided to a classifier to estimate the number of moving people in that cluster.

Hashemzadeh et al. can suffer from occlusion between individuals and other scene objects because it depends heavily on the effectiveness of the tracking technique. Furthermore, it is challenging to cluster local features for huge and dense crowds with heavy occlusions and random fluctuations. Another drawback is that the hand-crafted features used to determine the number of pedestrians corresponding to a point cluster are predicated using a number of assumptions (e.g., linear relationship between interest points and person counts, boundary identification). Finally, similar to most prior art, this work assumes that humans are the only moving objects within the scene. Other moving objects (e.g., vehicles, animals, etc.) cannot be detected or removed, limiting this systems effectiveness in the real-world.

In Ryan et al.: Crowd counting using group tracking and local features; 2010 7th IEEE International Conference on Advanced Video and Signal Based Surveillance, pages 218-224, IEEE, 2010, herein incorporated by reference, motion cues and tracking are used to create a person counting system. Similar to other disclosures as noted above, Ryan et al. group people using blobs in an extracted foreground image. Ryan et al. provides the set of hand-crafted local features that are extracted from these blobs (e.g., area, perimeter, edge-angle histograms, etc.). These features are fed into a least-squares linear model to regress the number of people. Inter-frame tracking is used to improve the robustness of the count estimates in a rule-based fashion, identifying events such as the splitting or merging of blobs.

In Ryan et al., the representational power of these extracted features from blobs (e.g., area, perimeter) heavily relies upon the foreground segmentation results, which are known to be notoriously noisy in practice. Even assuming precise foreground segmentation, the accuracy of the detection algorithm depends on the selection of features. Hand-crafted features based on foreground blob shape and size are unlikely to generalize well to new environments, as they are highly dependent on the camera viewpoint and angle.

Another example where the motion information is used to improve counting is given in Liang et al.: Counting crowd flow based on feature points; Neurocomputing, 133:377-384, 2014, herein incorporated by reference. Liang et al. applied a three-frame difference algorithm to extract a binary mask containing movement only. The region of the binary mask is used to extract SURF (Speeded Up Robust Features) features which are clustered using an improved version of DBSCAN (Density-Based Spatial Clustering of Applications with Noise). Eigenvector-based features are extracted from the clusters and provided to a support vector regressor to attain person counts as well as the orientation of motion.

Although Liang et al. propose a technique to reduce the effects of perspective distortion, the technique may not work generally because the technique presumes that the bottom points of the cluster lie on the ground plane. Foreground detection imperfections or occlusions can violate this assumption. In addition, the assumption of motion coherency of a crowd may not always be valid due to limb articulation. Finally, like most existing disclosures, Liang et al. presumes the only moving objects within the scene are humans.

In Sidla et al.: Pedestrian detection and tracking for counting applications in crowded situations; International Conference on Advanced Video and Signal-Based Surveillance (AVSS), pages 70-75, 2006, herein incorporated by reference, a pedestrian detection and tracking system is proposed that enables the counting of persons in densely crowded scenes by combining motion estimation, texture analysis and shape matching. First, the system computes a region of interest poll containing every foreground shape using foreground segmentation. Second, contour-based searching methods are applied (e.g. Canny Edge detector) followed by Active Shape Model (ASM) to detect the shape of humans with the goal of reducing the search space by limiting unnecessary edges/areas from the Region of Interest (ROI) poll. Eventually, after filtering out the ROI poll, Sidla et al. applies KLT (Kanade-Lucas-Tomasi) algorithm to obtain trajectories to track the detected shapes. In addition, Sidla et al. apply trajectory clustering to obtain the people count.

Sidla et al. is able to differentiate pedestrian movement from other objects by shape matching (head and shoulders); however, in crowded scenes (e.g. playgrounds, protests, shopping malls) due to perspective distortion, severe occlusion might occur, making this approach less practical. Moreover, this model suffers from the common restrictions of foreground segmentation (e.g., color camouflage, moving backgrounds etc.).

In Chinese Patent Application Publication CN107292908A to Liu et al. entitled Pedestrian Tracting Method Based On KLT Feature Point Tracking Algorithms, herein incorporated by reference, the inventors propose a person tracking method that combines detection and the KLT algorithm. Liu et al. disclose a feature filtering process, which localizes the people in the image for tracking. The inventors use a Histogram of Oriented Gradients (HoG) feature selection method. With the extracted features, Liu et al. train a classifier that is able to detect humans. KLT feature tracking is applied within the areas corresponding to the humans, thus performing target tracking.

In Liu et al., the computation cost for HoG and SVM are very high. In real-time environments, this algorithm might suffer from inference complexity. Moreover, HoG are traditional, hand-crafted features. Recent advances in computer vision have universally demonstrated that visual features learned using deep learning methods significant outperform hand-crafted features. A further limitation of this work is that detection-based methods tend to break down in complicated scenes where the size of the visible persons is small and there is significant inter-person occlusion. In such scenarios, regression based approaches (e.g., crowd counting networks) tend to provide more accurate person localization.

It is desirable to provide a crowd motion summarization method that can automatically and efficiently summarize crowd movements from a video.

It is desirable to use crowd density estimates to extract more accurate crowd movements from a video.

It is desirable to provide a crowd motion summarization method that can generate crowd motion data that combines crowd motion estimation and crowd counting.

It is desirable to provide a crowd motion summarization method that is applicable to a wide range of applications with minimal reliance on hand-crafted features.

SUMMARY

Example embodiments provide a crowd motion summarization method, device and system, to generate crowd motion data from a video. The video frame can contain humans, non-human objects, and background. For example, the crowd motion summarization method, device and system can be used to automatically and efficiently count crowds (humans), crowd speeds and crowd orientations in the video.

According to a first aspect, the method is for crowd counting and crowd motion summarization of a video containing video frames. A feature tracking module receives each video frame and detects features (feature points) from the video frame. A crowd occupancy detection module receives the video frame and detects human location from the video frame, and generates a binary crowd occupancy map having human pixel positions indicate the human location versus non-human location. The crowd occupancy detection module generates a total human count of the humans detected in the video frame. The feature tracking module generates feature tracking information for only those features contained in the human pixel positions which indicate the human location. A feature-crowd matching module generates, from the feature tracking information of one or more of the features and the total human count: crowd motion data. A data visualization module generates, using the crowd motion data: visualization data. The method outputs the visualization motion data.

A technical effect of the crowd motion summarization method of example embodiments is that the method can be automatically and efficiently summarize crowd movements from a video.

Another technical effect of the crowd motion summarization method is that the binary crowd occupancy map provides a filter to better delineate image regions corresponding to a crowd, yielding more robust, accurate motion estimates.

Another technical effect of the crowd motion summarization method is that the binary crowd occupancy map can be generated using the video frame without regard to previous video frames, and therefore does not require complex labelling or human tracking algorithms.

Another technical effect of the crowd motion summarization method is that other distracting moving objects (e.g., cars, motorcycles, swaying trees, flying birds) are removed via the binary crowd occupancy map. The crowd motion summarization method produces a more pure measure of crowd motion, is robust to illumination changes, and requires less or no computation on the non-human pixel positions of the binary crowd occupancy map.

Another technical effect is that the crowd motion summarization method uses crowd density estimates to extract more accurate crowd motion from the video frame.

Another technical effect is that the crowd motion data is generated for each frame by comparing to the previous frame, which does not require entire video files.

In an example of the first aspect, the crowd motion data includes: i) a human speed count of human speed, ii) a human orientation count of human orientation, and iii) a time of the video frame.

A technical effect of the crowd motion summarization method of example embodiments is that the method can generate, from the video, the crowd motion data that combines crowd motion estimation and crowd counting.

In an example of the first aspect, the crowd motion summarization method includes generating the histogram of motion summaries in near real-time, as-needed, as soon as the crowd motion data is generated from each subsequent video frame.

A technical effect is that the crowd motion data is generated for each frame by comparing to the previous frame, which does not require entire video files in order to generate real-time crowd motion data.

In an example of the first aspect, the crowd motion summarization method includes generating, using the crowd visualization module, a histogram of motion summaries, as follows: first histogram of human speed, time, human speed count; and second histogram of human orientation, time, human orientation count.

A technical effect of the crowd motion summarization method is that the histogram of motion summaries combines crowd motion and person counts to create a rich descriptor of crowds in videos.

In an example of the first aspect, the crowd motion summarization method includes receiving a video frame; generating, using a crowd occupancy detection module and the video frame: a binary crowd occupancy map of the video frame having human pixel positions which indicate human location versus non-human location, and a total human count of humans detected in the video frame; generating, using a feature tracking module and the video frame: a feature map including feature location of features detected in the video frame; generating, using the feature tracking module, the feature map, the binary crowd occupancy map, the video frame, a previous video frame, and previous feature location of previous features detected from the previous video frame: feature tracking information for only each feature in the human pixel positions for the video frame, including: i) the feature location, ii) feature speed, iii) feature orientation, and iv) total feature count; and generating, using a feature-crowd matching module, the feature tracking information, and the total human count: crowd motion data including: i) a human speed count of at least one human speed, ii) a human orientation count of at least one human orientation.

In an example embodiment of any of the above, the crowd motion data further includes: iii) time of the video frame, the method further comprising generating, using a data visualization module and the crowd motion data: visualization data of the crowd motion data.

In an example embodiment of any of the above, the method further includes generating, using the data visualization module: the visualization data including at least one table which includes the human speed count and the human orientation count.

In an example embodiment of any of the above, the method further includes generating, using the data visualization module: the visualization data including at least one table which includes: i) the human speed count, ii) the human orientation count, and iii) the time of the video frame.

In an example embodiment of any of the above, the method further includes generating the visualization data for at least one other video frame, wherein the at least one table further includes: a first histogram of the human speed count, the human speed, and the time, and a second histogram of the human orientation count, the human orientation, and the time.

In an example embodiment of any of the above, the method further includes generating, using the data visualization module and the video frame: a first overlay of the video frame with the crowd motion data overlaid on the video frame.

In an example embodiment of any of the above, the method further includes generating, using the data visualization module and the previous video frame: a second overlay of the previous video frame with previous crowd motion data overlaid on the previous video frame; and generating the crowd motion data to display the first overlay and the second overlay on a same display screen.

In an example embodiment of any of the above, the generating the crowd motion data is performed in near real-time when the video frame is received.

In an example embodiment of any of the above, the generating the binary crowd occupancy map using the crowd occupancy detection module includes: generating, using a crowd density estimating module and the video frame: a crowd density map which includes a probability of the human location; generating, using a binary threshold module and the crowd density map: a threshold binary crowd occupancy map of the crowd density map for the probability that exceeds a threshold, the threshold binary crowd occupancy map having the human pixel positions which indicate the human location versus the non-human location; and generating, using a morphological transformation module and the threshold binary crowd occupancy map: the binary crowd occupancy map from the threshold binary crowd occupancy map which accounts for morphological human features.

In an example embodiment of any of the above, the morphological transformation module includes a dilation module configured to dilate the human pixel positions which indicate the human location.

In an example embodiment of any of the above, the features are Kanade-Lucas-Tomasi (KLT) features, wherein the feature tracking information includes KLT feature tracking information, wherein the feature locations are KLT feature locations, wherein the generating the feature tracking information includes: generating, using a KLT feature extraction module and the video frame: a KLT feature map of KLT feature location of the KLT features detected in the video frame; generating, by element-wise multiplying of the KLT feature map with the binary crowd occupancy map: a filtered KLT feature map with only the KLT feature locations in the human pixel positions for the video frame; generating, using a KLT feature tracking module: a respective feature tracklet between the KLT feature location of each KLT feature and a previous KLT feature location detected from the previous video frame; and generating, using a speed and orientation estimator module and the respective feature tracklet: the feature tracking information for each KLT feature, including: KLT feature speed, and KLT feature orientation.

In an example embodiment of any of the above, the features are KLT features, and wherein the feature tracking information includes KLT feature tracking information.

In an example embodiment of any of the above, the generating using the feature-crowd matching module includes estimating a number of the features per human.

In an example embodiment of any of the above, the feature orientation for an $i^{th}$ feature is calculated as:

$$\theta^i = \arctan\frac{(y_n^i - y_{n-1}^i)}{(x_n^i - x_{n-1}^i)};$$

and
wherein the feature speed for the $i^{th}$ feature is calculated as:

$$M^i = \sqrt{(x_n^i - x_{n-1}^i)^2 + (y_n^i - y_{n-1}^i)^2},$$

wherein (x, y) are Cartesian co-ordinates of the feature location for the $i^{th}$ feature, n is the video frame, and n−1 is the previous video frame.

In an example embodiment of any of the above, the method further includes: receiving the previous video frame; and generating, using the feature tracking module, for each previous feature detected in the previous video frame: the previous feature location.

In an example embodiment of any of the above, the method further includes: generating, using the crowd occupancy detection module and the previous video frame: a previous binary crowd occupancy map of the previous video frame having the human pixel positions which indicate the human location versus the non-human location; and wherein the generating the previous feature location is performed on only each feature in the human pixel positions of the previous binary crowd occupancy map for the previous video frame.

In an example embodiment of any of the above, the generating the binary crowd occupancy map uses the video frame without using any previous video frame or any previous binary crowd occupancy map.

In an example embodiment of any of the above, the crowd occupancy detection module includes a crowd occupancy detection model.

In an example embodiment of any of the above, the feature tracking module includes a feature tracking model.

According to a second aspect, a crowd motion summarization system is provided, where the crowd motion summarization system includes modules configured to perform the method in the first aspect.

In an example embodiment of the second aspect, the crowd motion summarization system includes the following modules: the feature tracking module, the crowd occupancy detection module, the feature-crowd matching module, and the data visualization module.

In an example embodiment of the second aspect, the modules each include a model. In some examples, each model is a trained model.

According to a third aspect, a crowd motion summarization apparatus is provided, where the crowd motion summarization apparatus includes: a memory, configured to store a program; at least one processor, configured to execute the program stored in the memory, and when the program stored in the memory is executed, the at least one processor is configured to perform the method in the first aspect. In an example embodiment of the third aspect, the crowd motion summarization apparatus is a user equipment.

According to a fourth aspect, a computer readable medium is provided, where the computer readable medium stores program code executed by the crowd motion summarization apparatus, and the program code performs the method in the first aspect when executed by at least one processor of the crowd motion summarization apparatus.

According to a fifth aspect, a computer program product including instructions is provided. When the computer program product is run on a computer, the crowd motion summarization apparatus performs the method in the first aspect.

According to a sixth aspect, a computer chip is provided, where the computer chip includes a processor and a data interface, and the processor reads, by using the data interface, instructions stored in a memory, to perform the method in the first aspect.

Optionally, in an implementation, the computer chip may further include the memory. The memory stores the instructions, and the processor is configured to execute the instructions stored in the memory. When the instructions are executed, the processor is configured to perform the method in the first aspect.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION

Figure 1:
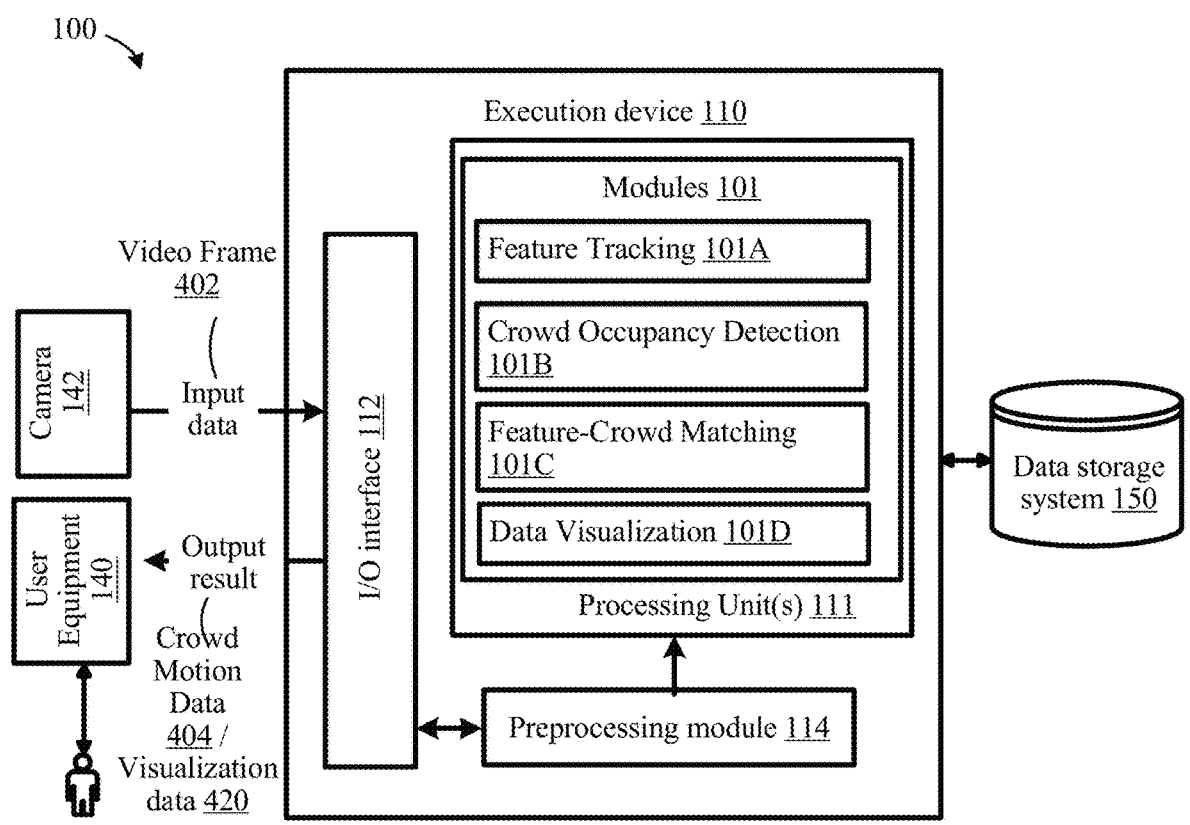
FIG. 1 is a schematic structural diagram of a system architecture of a crowd motion summarization system, in accordance with an example embodiment.

The following describes technical solutions of example embodiments with reference to accompanying drawings.

The terms person and human are used interchangeably herein.

A crowd includes a plurality of humans, which can be some, hundreds, or at least thousands of humans. Examples of the crowd motion summarization system and the crowd motion summarization method in accordance with example embodiments can be used to detect and summarize movement of as few as one human.

In some examples, a video can be considered a sequence of images (generally referred to as video frames).

In some examples, the location or position of an object in a video frame is represented by: a Cartesian co-ordinate such as (x, y) or (x, y, z) (i.e. a pixel), a plurality of pixels, a bounding box (which can be represented by two diagonal pixels), a polygon box, or a 2-Dimensional map (having one or more color channels) in which one or more pixel positions have a particular pixel value (e.g. a mask, outline, or edges of the object).

An example embodiment is an execution device or a user equipment configured to execute a crowd motion summarization method which generates crowd motion data from a video. The video contains video frames which contain humans (i.e., a crowd) that move throughout the video. For example, the crowd motion summarization method can be used to count, over a number of video frames, the total number of humans, count humans that are moving at a given speed, and count humans that are moving at a given orientation (angular direction).

The crowd motion summarization method automatically processes each video frame containing humans, and is able to generate crowd motion data from the video frame by comparing to a previous video frame.

The crowd motion summarization method provided in example embodiments can be applied to a first example scenario in which a video frame of a video contains humans having crowd motion that may be summarized. The video frame is received by a camera, for example by using an on-board camera of a user equipment, or another camera, to capture a video frame. The method processes the video frame and detects features (feature points) from the video frame. The method processes the video frame and detects humans from the video frame, and generates a binary crowd occupancy map having human pixel positions indicate the human location versus non-human location. The method generates a total human count. The method generates feature tracking information for only those features contained in the human pixel positions which indicate the human location. The method generates, using the feature tracking information and the total human count: crowd motion data. The method outputs the crowd motion data.

Therefore, a technical effect of the crowd motion summarization method is that the method can be automatically and efficiently summarize crowd movements from a video.

Another technical effect of the crowd motion summarization method is that the binary crowd occupancy map provides a filter to better delineate image regions corresponding to a crowd, yielding more robust, accurate motion estimates.

Another technical effect of the crowd motion summarization method is that the binary crowd occupancy map can be generated using the subject video frame only without regard to previous video frames, and therefore does not require complex labelling or human tracking algorithms.

Another technical effect of the crowd motion summarization method is that other distracting moving objects (e.g., cars, motorcycles, swaying trees, flying birds) are removed via the binary crowd occupancy map. The crowd motion summarization method produces a more pure measure of crowd motion, is robust to illumination changes, and requires less or no computation on the non-human pixel positions of the binary crowd occupancy map.

Another technical effect is that the crowd motion summarization method uses crowd density estimates to extract more accurate crowd motion from the video frame.

Another technical effect is that the crowd motion data is generated for each frame by comparing to the previous frame, which does not require entire video files.

The crowd motion summarization method provided in example embodiments can be applied to a second example scenario in which the user camera has an onboard camera which captures video frames. The user equipment performs the crowd motion summarization method and receives the video frame and generates crowd motion data from the video frame. The user equipment outputs the crowd motion data to a display screen of the user equipment.

In another example of the second example scenario, the user equipment generates the crowd motion data in near real-time, as-needed, as soon as the video frames are captured by the onboard camera.

FIG. 1 illustrates a system architecture of a crowd motion summarization system 100 in accordance with an example embodiment. One or more processing unit(s) 111 can include a host CPU and other processing units (a Neural Processing Unit (NPU), a tensor processing unit (TPU), a graphics processing unit (GPU), or the like). The processing unit(s) 111 execute modules 101, which include a feature tracking module 101A, a crowd occupancy detection module 101B, a feature-crowd matching module 101C, and a data visualization module 101D.

The modules 101 can be used to implement aspects of the crowd motion summarization method (FIG. 4) according to an example embodiment. The input to the modules 101 can be a video frame 402 of a video which contains one or more humans. The video frame 402 can be received from a camera 142 or from a user equipment 140.

In an example, the modules 101 each include a trained model. By way of example, the feature tracking module 101A can include a feature tracking model, the crowd occupancy detection module 101B can include a crowd occupancy detection model, the feature-crowd matching module 101C can include a feature-crowd matching model, and the data visualization module 101D can include a data visualization model.

In an example, the feature tracking module 101A is configured to detect features in the video frame 402. In an example, the features are feature points (also known as feature edge points, KLT corners or Harris corners) of visual features of particular edges detected from the video frame 402. The feature tracking module 101A generates, using the video frame 402: a feature map including feature location of each feature (edge point) detected in the video frame 402. For example, the feature tracking module 101A generates a feature map which indicates each feature location of each feature as a pixel.

In an example, the crowd occupancy detection module 101B is configured to generate, using the video frame 402: human localization information of humans detected in the video frame 402, including: a binary crowd occupancy map of the video frame 402, and a total human count of the humans detected in the video frame. The binary crowd occupancy map has human pixel positions which indicate the human location versus non-human location.

Figure 5:
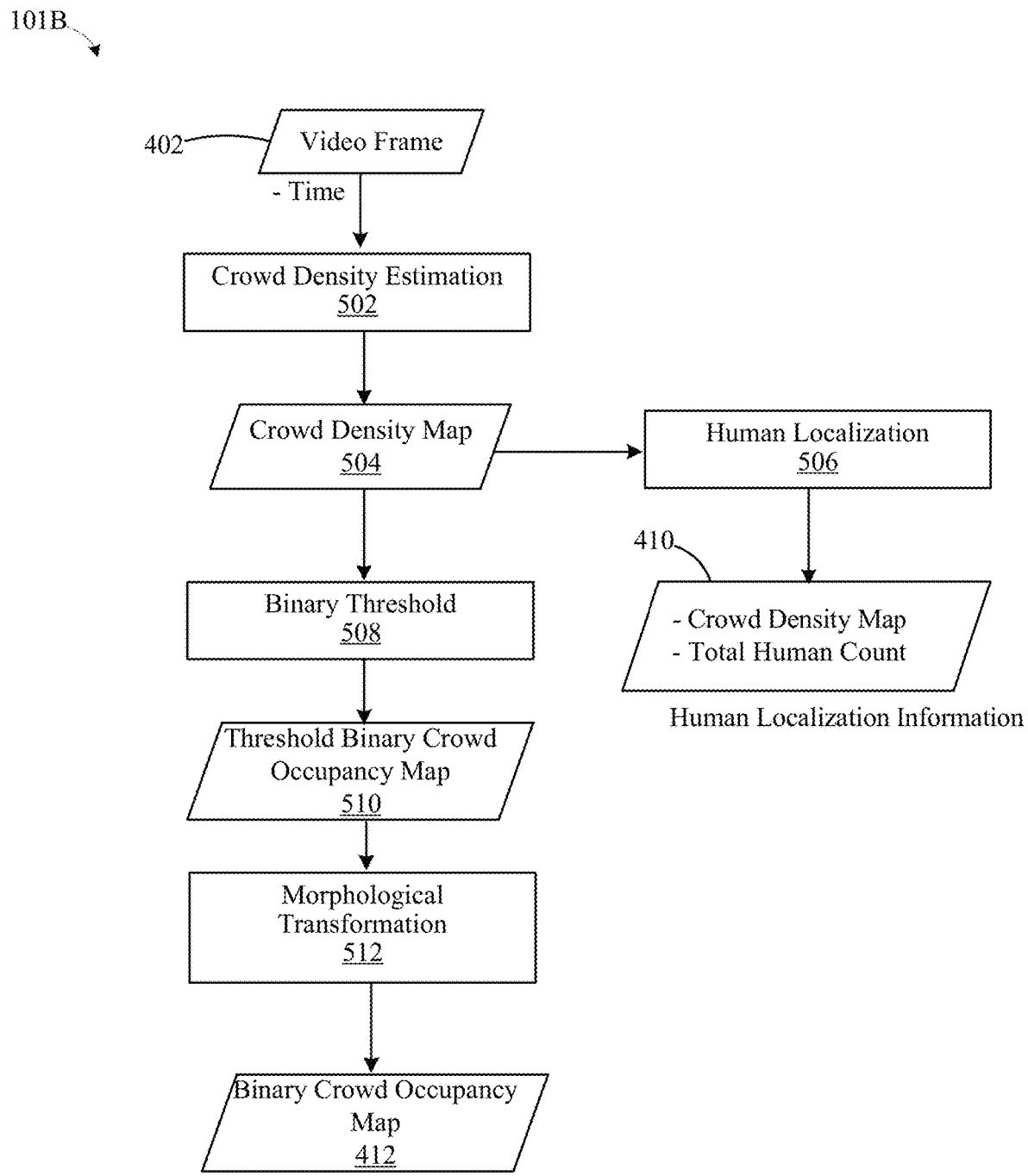
FIG. 5 is a detail flow diagram of crowd occupancy detection performed by the crowd motion summarization system, in accordance with an example embodiment.

In an example, the crowd occupancy detection module 101B can include a crowd occupancy detection model. An example trained crowd occupancy detection model of the crowd occupancy detection module 101B is illustrated in FIG. 5, and is described in greater detail herein below. The crowd occupancy detection module 101B can include a deep neural network (DNN).

The feature tracking module 101A is also configured to generate, using the filtered feature map, the binary crowd occupancy map, the video frame, a previous video frame and a previous filtered feature map of the previous video frame: feature tracking information for each feature in the human pixel positions for the video frame 402, including: i) feature location, ii) feature speed, iii) feature orientation, and iv) total feature count.

Figure 6:
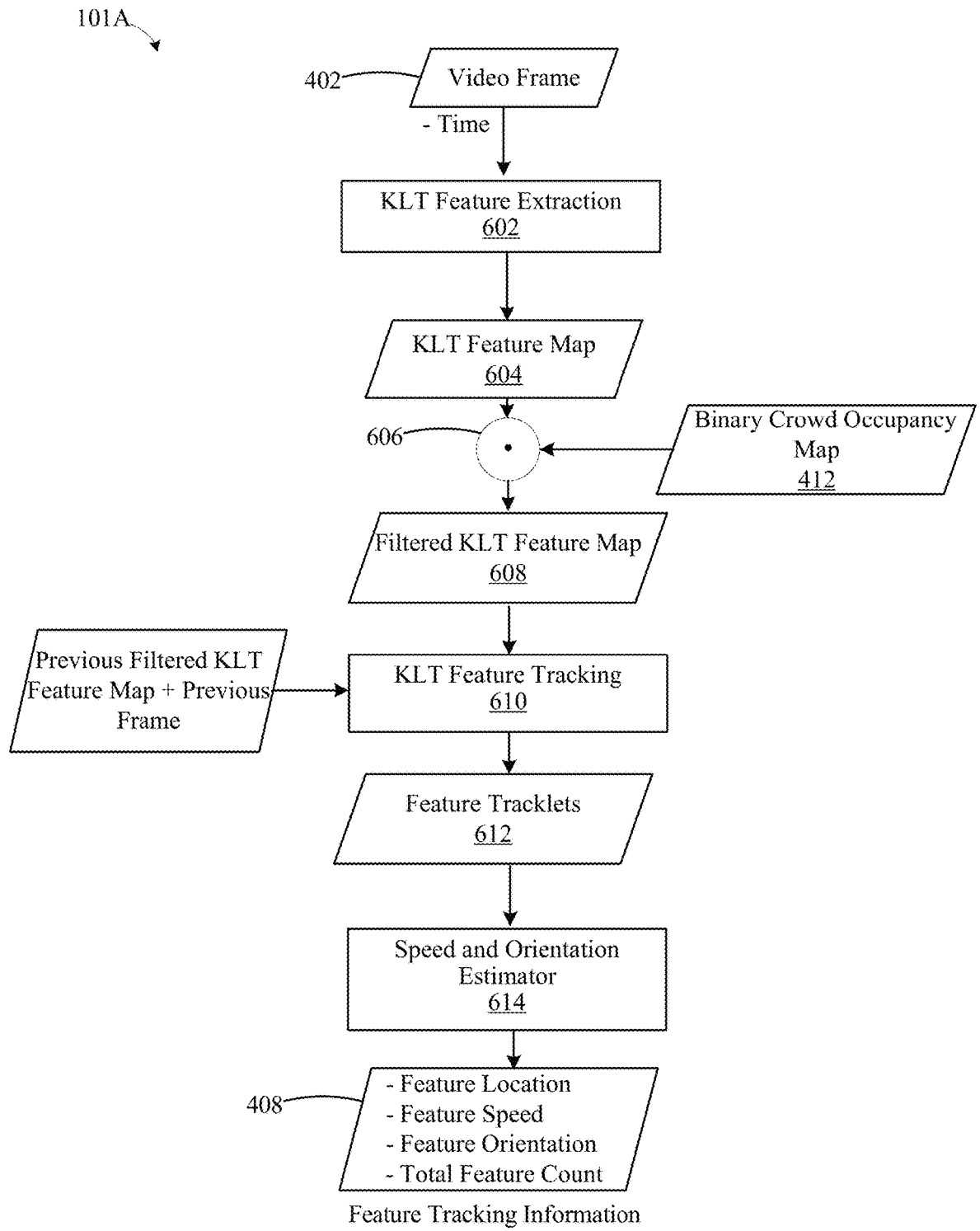
FIG. 6 is a detail flow diagram of feature tracking performed by the crowd motion summarization system.

In an example, the feature tracking module 101A can include a feature tracking model. An example trained feature tracking model of the feature tracking module 101A is illustrated in FIG. 6, and is described in greater detail herein below. The feature tracking module 101A can include a DNN. In an example, the feature tracking module 101A can include a Kanade-Lucas-Tomasi (KLT) feature tracking model obtained from a library.

In an example, the feature-crowd matching module 101C is configured to generate, using the feature tracking information and the total human count: the crowd motion data 404. The crowd motion data 404 includes: i) human speed count, ii) human orientation count, iii) total human count, and iv) time.

In an example, the feature-crowd matching module 101C includes a set of rules for matching features with human localization information detected in the video frame 402. For example, the feature-crowd matching module 101C divides the total human count by the total feature count, arriving at an average number of features per human in the video frame 402. The feature-crowd matching module 101C includes rules as to how to generate (infer) the crowd motion data 404 from the average number of features per human and the feature tracking information. The inference can be made using statistical averages from the average number of features per human.

Figure 4:
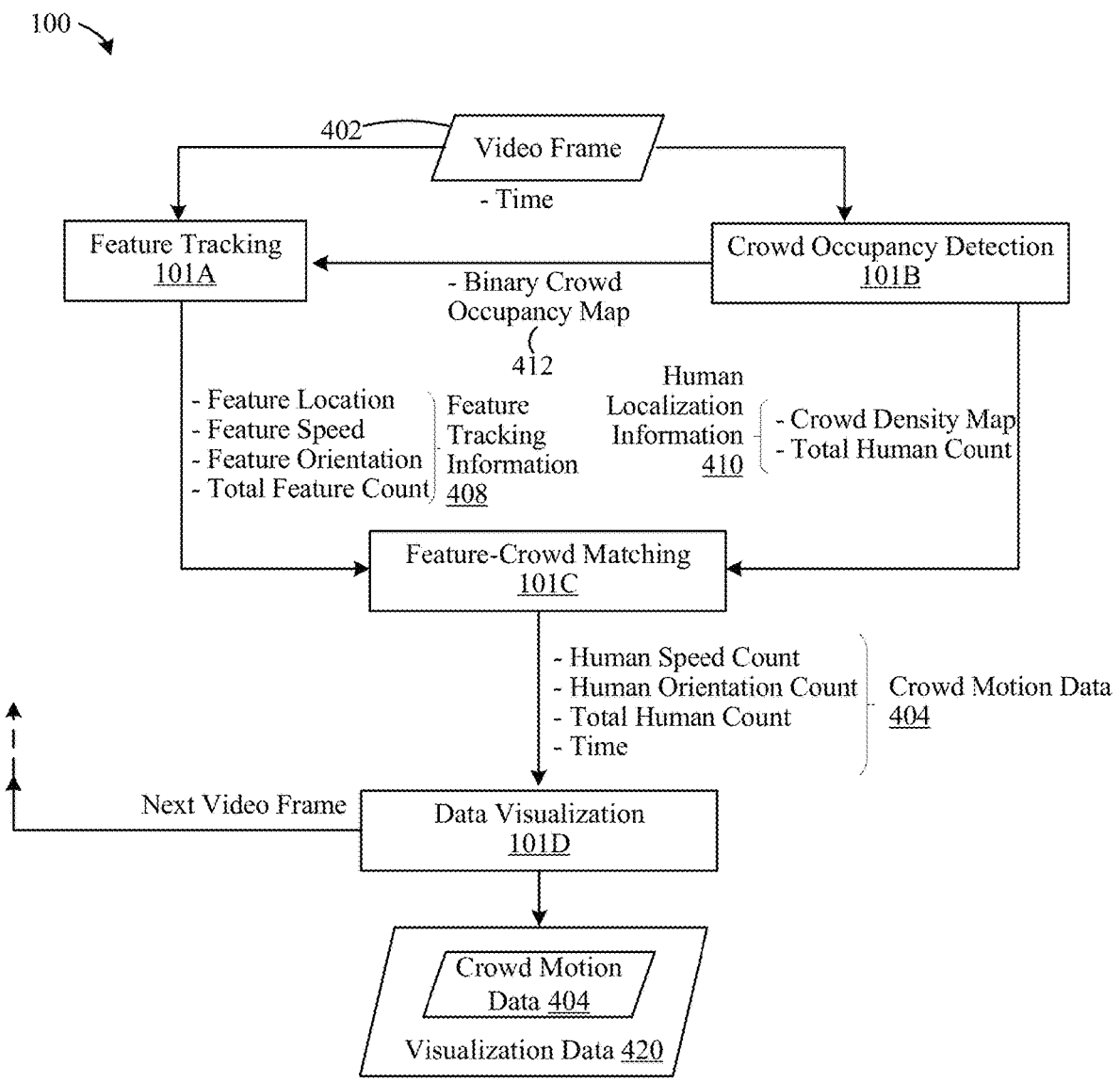
FIG. 4 is an example crowd motion summarization method performed by the crowd motion summarization system, in accordance with an example embodiment.

In an example, the feature-crowd matching module 101C can include a feature-crowd matching model. The feature-crowd matching model infers, from the total count and the feature tracking information: the total human speed count and the total human orientation. An example trained feature-crowd matching model of the feature-crowd matching module 101C is illustrated in FIG. 4, and is described in greater detail herein below.

In an example, the data visualization module 101D is configured to generate, from the crowd motion data 404 and the video frame 402: visualization data 420. In an example, the visualization data 420 and the crowd motion data 404 can provide a rich descriptor for crowds in the video frame 402.

An example of the visualization data 420 generated by the feature-crowd matching module 101C is illustrated in FIGS. 9, 10, 11A, 11B, 11C, and 11D and is described in greater detail herein below.

In some examples, the data visualization module 101D is configured to generate an overlay of the crowd motion data 404 that is overlaid on the video frame 402. In some examples, the data visualization module 101D is configured to generate histograms, tables, summaries, charts, graphs, etc. In some examples, the data visualization module 101D is configured to detect an event from the crowd motion data 404, and generates an event indication as an output that indicates occurrence of the event.

In an example, the data visualization module 101D can include a data visualization model. For example, the data visualization model can be trained with crowd motion data 404 and the resultant visualization data 420 that was desired for that particular crowd motion data 404. The particular slot intervals of the visualization data 420, such as human orientation and human speed, can be generated by the data visualization model 420.

In FIG. 1, the execution device 110 includes a network I/O interface 112 for communicating with a camera 142 using a communication protocol to receive the video frame 402 from the camera 142 and to transmit crowd motion data 404 to the user equipment 140. In an example, the camera 142 is an Internet Protocol (IP) camera that is configured to send video over a network or the Internet. A user may input data to the user equipment 140 which is then communicated to the I/O interface 112 using wired or wireless communication. In another example, the execution device 110 is part of the user equipment 140, and the user may input data over the I/O interface 112 to the execution device 110. In another example, the camera 142 is part of the execution device 110, and camera 142 transmits data over the I/O interface 112 to the execution device 110. In another example, the user equipment 140 includes the camera 142. In another example, second user equipment (not shown here) includes the camera 142.

The camera 142 can capture and transmit real-time video (e.g., as streaming video), or can capture and transmit video in batches, or can capture and transmit time-elapsed video. In some examples, the camera can capture a video for a particular time period and store the video in a memory. In an example embodiment, the input data may include: a video frame 402 generated (captured) by the camera 142. The camera 142 can also generate time data (time) associated with each video frame 402, such as a sequential video frame number, or a clock time. The time can be stored as metadata or within the video or the video frame 402. The camera 142 can be mounted to a stationary object, such as a building or pole. The camera 142 can be part of a mobile device, such as a dashboard camera of a vehicle, body camera, smart glasses, aerial camera (e.g. drone), handheld communication device, etc. The 142 camera can be manually or digitally controlled to captured desired orientations, such as Pan, Tilt and Zoom (PTZ).

In example embodiments, the video frame 402 is retrieved from the execution device 110 itself, the user equipment 140 itself, a different user equipment device, a cloud server, an Internet Protocol (IP) address, an externally accessed user account, an externally accessed social media account, or a video frame from the World Wide Web, etc.

In an optional example, a preprocessing module 114 is configured to perform preprocessing based on the input data (for example, the video frame 402) received via the I/O interface 112 from the camera 142 or the user equipment 140. In a related processing process in which the preprocessing module 114 performs preprocessing on the input data or the processing unit(s) 111 in the execution device 110 performs computation, the execution device 110 may invoke data, code, or the like from a data storage system 150, to perform corresponding processing, or may store, in a data storage system 150, data, an instruction, or the like obtained through corresponding processing. An example of preprocessing performed by the preprocessing module 114 is converting a color version of the video frame 402 to a grayscale version. Another example of preprocessing performed by the preprocessing module 114 is decoding a video frame file or a video file to extract the video frame 402 in a suitable image map format. In some examples, there is no preprocessing module 114 and preprocessing is not performed on the video frame 402.

The processing unit(s) 111 returns a processing result, for example, the crowd motion data 404, and the execution device 110 provides the processing result to the user equipment 140 via the I/O interface 112. The processing result can include the video frame 402 or video (e.g., in native or compressed file format), or with the crowd motion data 404 overlaid on the video frame 402 or the video. The user equipment 140 can include a display screen that displays the crowd motion data 404.

In another example, the user equipment 140 may transmit to the execution device 110, via the I/O interface 112, an identification of the video that contains the video frame 402 and causing the video containing the video frame 402 to be retrieved by the execution device 110 via I/O interface 112 (e.g. the user equipment 140 sending an identifier or an address of where to retrieve the video frame 402).

In an example, each of the modules 101 can include a DNN. The DNN can also be referred to as a multi-layer neural network and may be understood as a neural network that includes a first layer (generally referred to as an input layer), a plurality of hidden layers, and a final layer (generally referred to as an output layer).

The DNN can be implemented by a Convolutional Neural Network (CNN), which is a deep neural network with a convolutional structure. The convolutional neural network includes a feature extractor consisting of a convolutional layer and a sub-sampling layer. The feature extractor may be considered as a filter. A convolution process may be considered as performing convolution on an image or a convolutional feature map (feature map) by using a trainable filter. The convolutional layer indicates a layer of neurons at which convolution processing is performed on an input in the convolutional neural network. At the convolutional layer of the convolutional neural network, one neuron may be connected only to neurons at some neighboring layers. One convolutional layer usually includes several feature maps, and each feature map may be formed by some neurons arranged in a rectangle. Neurons at a same feature map share a weight. The shared weight herein is the convolutional kernel. The shared weight may be understood as being unrelated to a manner and a position of image information extraction. A hidden principle is that statistical information of a part of an image is the same as that of another part. This indicates that image information learned in a part may also be used in another part. A plurality of convolutional kernels may be used at a same convolutional layer to extract different image information. Generally, a larger quantity of convolutional kernels indicates that richer image information is reflected by a convolution operation.

It should be noted that FIG. 1 is merely a schematic diagram of a system architecture of the crowd motion summarization system 100 according to an example embodiment. Position relationships between the execution device 110, the user equipment 140, the processing unit(s) 111, the preprocessing module 114, and the like that are shown in FIG. 1 do not constitute any limitation. For example, the data storage system 150 is an external memory relative to the execution device 110. In another example, the data storage system 150 may be part of (i.e. located in) the execution device 110.

As shown in FIG. 1, in some examples, parts of the feature tracking module 101A may be obtained through libraries, such as a KLT feature tracking model obtained from a library. Similarly, parts of the crowd occupancy detection module 101B may be obtained through libraries, in which the library contains labelled images of humans or human heads.

Figure 2:
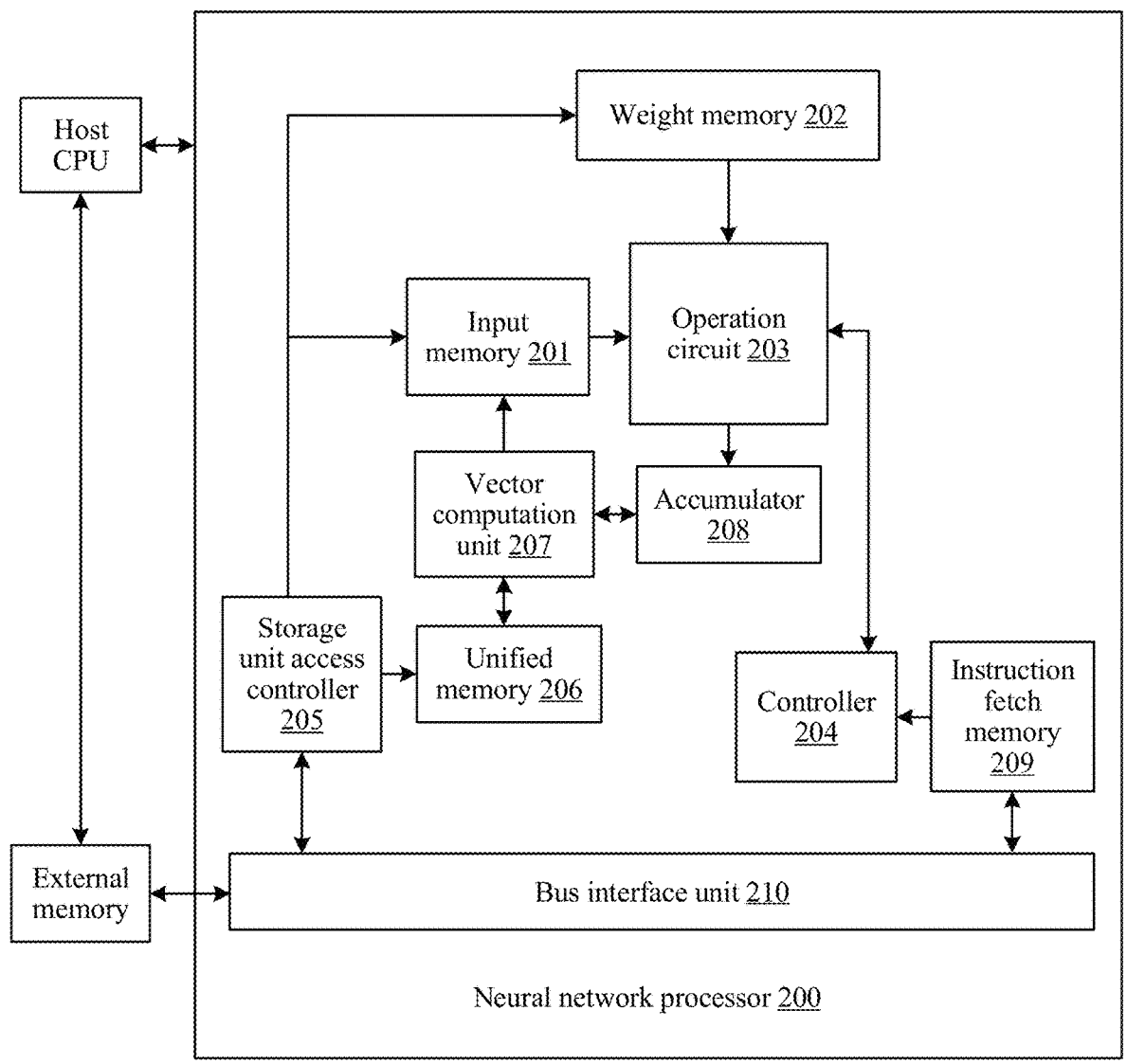
FIG. 2 is a schematic diagram of a hardware structure of a chip according to an example embodiment of the crowd motion summarization system.

FIG. 2 shows a block diagram of a neural network processor 200 implemented in the execution device according to an example embodiment. The computer chip may be provided in the execution device 110 shown in FIG. 1, to perform computations of the models of the crowd motion summarization system 100. The processing unit(s) 111 (FIG. 1) can include a host CPU and the neural network processor 200.

The neural network processor 200 may be any processor that is applicable to neural network computations, for example, a Neural Processing Unit (NPU), a tensor processing unit (TPU), a graphics processing unit (GPU), or the like. The NPU is used as an example. The NPU may be mounted, as a coprocessor, to the host CPU (Host CPU), and the host CPU allocates a task to the NPU. A core part of the NPU is an operation circuit 203. A controller 204 controls the operation circuit 203 to extract matrix data from memories (input memory 201 and weight memory 202) and perform multiplication and addition operations.

In some implementations, the operation circuit 203 internally includes a plurality of processing units (also known as a Process Engine, PE). In some implementations, the operation circuit 203 is a bi-dimensional systolic array. In addition, the operation circuit 203 may be a uni-dimensional systolic array or another electronic circuit that can implement a mathematical operation such as multiplication and addition. In some implementations, the operation circuit 203 is a general matrix processor.

For example, it is assumed that there are an input matrix A, a weight matrix B, and an output matrix C. The operation circuit 203 obtains, from a weight memory 202, weight data of the matrix B, and caches the data in each PE in the operation circuit 203. The operation circuit 203 obtains input data of the matrix A from an input memory 201, and performs a matrix operation based on the input data of the matrix A and the weight data of the matrix B. An obtained partial or final matrix result is stored in an accumulator (accumulator) 208.

A unified memory 206 is configured to store input data and output data. Weight data is directly moved to the weight memory 202 by using a storage unit access controller 205 (referred to as a Direct Memory Access Controller, DMAC). The input data is also moved to the unified memory 206 by using the DMAC.

A bus interface unit (BIU) 210 is used for interaction between the DMAC and an instruction fetch buffer 209 (memory). The bus interface unit 210 is further configured to enable the instruction fetch buffer 209 to obtain an instruction from an external memory, and is further configured to enable the storage unit access controller 205 to obtain, from the external memory, source data of the input matrix A or the weight matrix B.

The DMAC is mainly configured to move input data from an external memory Double Data Rate (DDR) to the unified memory 206, or move the weight data to the weight memory 202, or move the input data to the input memory 201.

A vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203. The vector computation unit 207 is mainly used for computation at a non-convolutional layer or fully-connected layers (FC, fully connected layers) of a neural network, and specifically, may perform processing on computation such as pooling (pooling) or normalization (normalization). For example, the vector computation unit 207 may apply a nonlinear function to an output of the operation circuit 203, for example, a vector of an accumulated value, to generate an activation value. In some implementations, the vector computation unit 207 generates a normalized value, a combined value, or both a normalized value and a combined value.

In some implementations, the vector computation unit 207 stores a processed vector to the unified memory 206. In some implementations, the vector processed by the vector computation unit 207 may be used as activation input to the operation circuit 203, for example, to be used in a following layer of the neural network.

The instruction fetch memory 209 (Instruction Fetch Buffer) connected to the controller 204 is configured to store an instruction used by the controller 204.

The unified memory 206, the input memory 201, the weight memory 202, and the instruction fetch memory 209 are all on-chip memories. The external memory is independent from the hardware architecture of the NPU.

Figure 3:
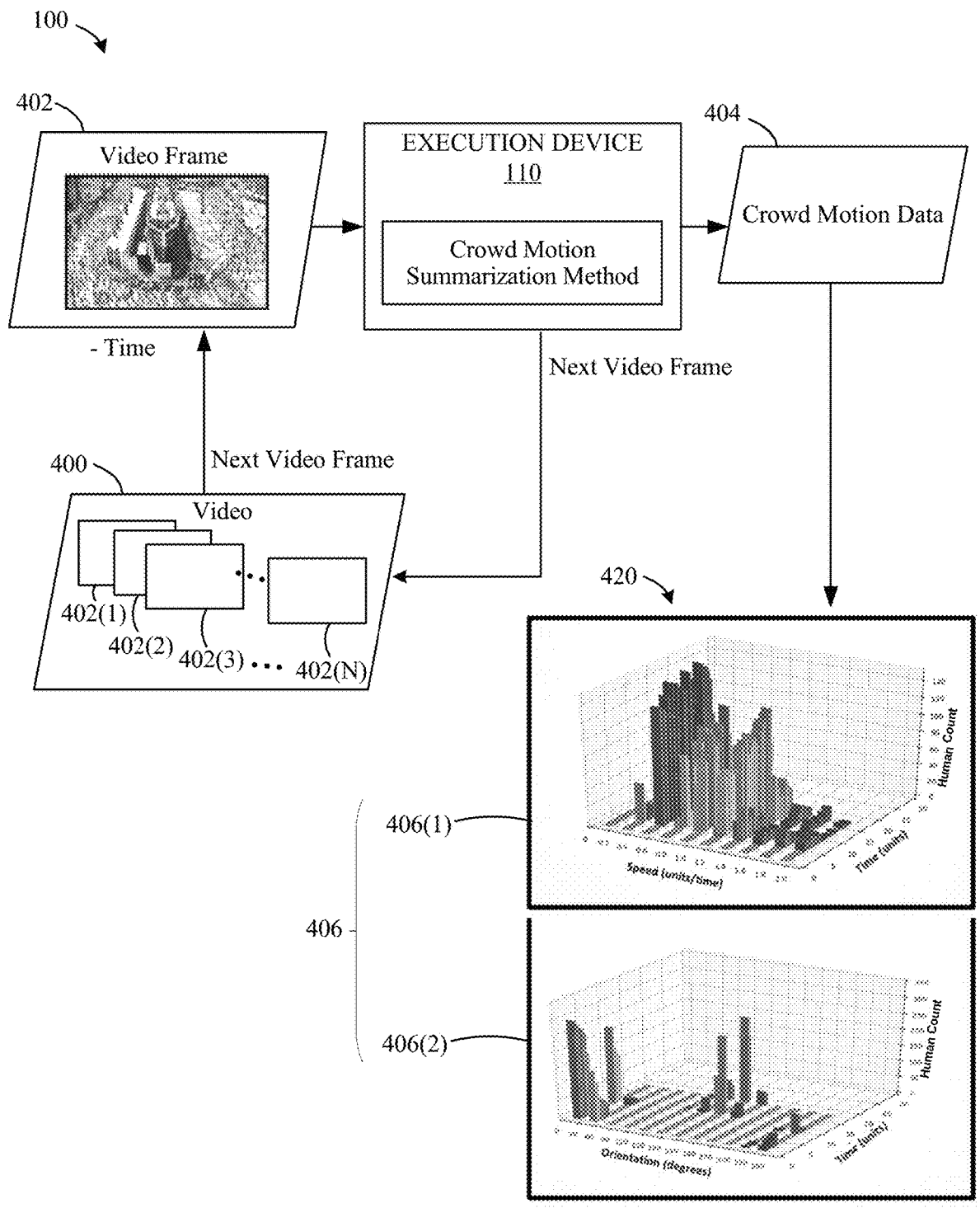
FIG. 3 is a pictorial representation of the crowd motion summarization system, in accordance with an example embodiment.

FIG. 3 illustrates an example of the crowd motion summarization system 100 which is configured to perform the crowd motion summarization method, according to an example embodiment. The crowd motion summarization method may be specifically performed by the feature tracking module 101A, crowd occupancy detection module 101B, feature-crowd matching module 101C, and the data visualization module 101D. The execution device 110 executes the crowd motion summarization method.

The crowd motion summarization method is used to process a video 400. The video 400 include a plurality of video frames 402(1), 402(2), 402(3), . . . , 402(N) (each video frame can be individually referred to as 402 or 402(n)). The video 400 can be a video file having all of the video frames 402, or the video 400 can be a streaming video in which video frames 402 are received individually or in batches. In the case of an indefinite streaming video, the last video frame 402(N) is also indefinite. Each video frame 402 can be associated with time data, referred to as a time of the video frame 402. The time of a video frame 402 can be a video frame number in a series of video frame numbers, or a time unit, or a clock time.

In the example shown, the video frame 402 is a birds eye view (BEV), which is an overhead perspective view. In other examples, the video frame 402 is an overhead view, an elevation view, or other such views with or without standard perspective effects.

The crowd motion summarization method starts with receiving the video frame 402. An image file containing the video frame 402 in the crowd motion summarization method may be the input data provided by the camera 142 shown in FIG. 1. In another example, the user equipment 140 sends the video frame 402 to the execution device 110 from memory of the user equipment 140, e.g. as an image file or a video file. In another example, the user equipment 140 transmits a location of where the execution device 110 can access the video frame 402 (or the entire video 400), e.g., a server, an Internet Protocol address, a social media account. The time of the video frame 402 is also received. The crowd motion data 404 is output by the crowd motion summarization method in which the crowd motion data 404 is visualized by way of tables, overlays on the video frame 402, or summaries, etc.

The video frame 402 includes humans which are located by the crowd occupancy detection module 101B of the execution device 110. In an example, the crowd occupancy detection module 101B identifies humans as one single category and identifies non-humans as another single category. The non-human category can include all non-human objects (which may be stationary or moving) and background.

From the video 400 and the crowd motion data 404, the data visualization module 101D of the execution device 110 can generate visualization data 420.

The visualization data 420 of the crowd motion data 404 may still be referred to as crowd motion data 404 herein, and the terms can be used interchangeably depending on the example. For example, in some scenarios the visualization module 101D of the execution device 110 merely passes (sends) the crowd motion data 404 to the user equipment 140, and the user equipment 140 itself can have a visualization module 101D which generates, from the crowd motion data 404, the visualization data 420.

FIG. 4 is an example crowd motion summarization method performed on a video frame 402 by the crowd motion summarization system 100, according to an example embodiment. The crowd motion summarization method may be carried out by modules, routines, or subroutines of software executed by the processing unit(s) 111 of the execution device 110 or by the processing units of the user equipment 140. Coding of software for carrying out the steps of crowd motion summarization method is well within the scope of a person of ordinary skill in the art having regard to the described crowd motion summarization method. The crowd motion summarization method may contain additional or fewer steps than shown and described, and the steps may be performed in a different order. Computer-readable instructions executable by the processor(s) of the execution device 110 or the user equipment 140 may be stored in memory of the execution device or the user equipment 140, or a computer-readable medium. It is to be emphasized that the steps of the crowd motion summarization method need not be performed in the exact sequence as shown, unless otherwise indicated; and likewise various steps of the crowd motion summarization method may be performed in parallel rather than in sequence.

In an example scenario of the crowd motion summarization method, referring to FIG. 4, the execution device 110 receives a first video frame 402(1) of the video 400. The execution device 110 uses the feature tracking module 101A to detect features in the video frame 402(1). In an example, the features are feature points (also known as feature edge points, KLT corners or Harris corners) of visual features of particular edges detected from the video frame 402(1).

The feature tracking module 101A generates a filtered feature map. An example of the feature tracking module 101A is illustrated in greater detail in FIG. 6 but summarized briefly here in relation to FIG. 4. The feature tracking module 101A generates, using the first video frame 402(1): the feature location of each feature detected in the first video frame 402(1). For example, the feature tracking module 101A generates the feature points by way of a feature map which indicates each feature location of each feature as a pixel (edge point). In other examples, each generated feature location is represented by a Cartesian co-ordinate. The feature map (or feature location) can be temporarily stored in memory for comparison to a subsequent video frame (e.g. the second video frame 402(2) in this example) for tracking of each detected feature of interest. In an example, at this stage, the feature tracking module 101A does not consider whether the feature is part of a human or not. In an example, the feature tracking module 101A includes a KLT feature tracking module, and the generated features are KLT features defined by KLT feature points (also known as KLT corners).

Continuing with the example, the crowd occupancy detection module 101B generates, using the first video frame 402(1): a binary crowd occupancy map 412 of the first video frame 402(1) having human pixel positions which indicate the human location versus non-human location. The crowd occupancy detection module 101B generates, using the first video frame 402(1): a total human count of the humans detected in the video frame. An example of the crowd occupancy detection module 101B is illustrated in greater detail in FIG. 5. The binary crowd occupancy map 412 includes is to indicate human location and 0s to indicate non-human location. In an example, all other pixels that are not a human location are populated with 0s. Therefore, non-human moving objects which are distractors become populated in the binary crowd occupancy map 412 with 0s, e.g. moving cars, moving animals, clouds, swaying trees, etc. Therefore, in an example, the background of the video frame (402(1) is populated in the binary crowd occupancy map 412 with 0s, e.g. ground, buildings, sea and sky, etc.

Continuing with the example of FIG. 4, the feature tracking module 101A generates, using the feature map of the first video frame 402(1) and the binary crowd occupancy map 412 of the first video frame 402(1): a filtered feature map which contains the features for only those features that are in the human pixel positions for the first video frame 402(1). For example, the feature tracking module 101A generates the filtered feature map by performing element-wise multiplying (also known as Hadamard product) of the feature map and the binary crowd occupancy map 412. Therefore, only the pixel locations of the features that correspond to human pixels remain in the filtered feature map.

Because there is no previous video frame for tracking purposes, in some examples crowd motion data 404 is not generated for the first video frame 402(1) as there is nothing to compare. Rather, the next video frame 402 (i.e., a second video frame 402(2)) in the video 400 can be processed by the execution device and compared to a filtered feature map of the first video frame 402(1) to generate the crowd motion data 404.

Continuing with the example in FIG. 4, the execution device 110 receives a second video frame 402(2) of the video 400. The crowd occupancy detection module 101B generates, using the second video frame 402(2): human localization information 410 of humans detected in the second video frame 402(2), and a binary crowd occupancy map 412 of the second video frame 402(2) having human pixel positions which indicate the human location versus non-human location. The human localization information 410 can include: crowd density map of the second video frame 402(2), and total human count in the second video frame 402(2). An example of the crowd occupancy detection module 101B is illustrated in greater detail in FIG. 5.

The feature tracking module 101A generates feature tracking information 408, illustrated in greater detail in FIG. 6 but summarized briefly here. Continuing the example, the feature tracking module 101A generates, using the second video frame 402(2): a feature map including feature location of each feature (edge point) detected in the second video frame 402(2). For example, the feature tracking module 101A generates a feature map which indicates each feature location of each feature as a pixel. In some examples, each generated feature location is represented by a Cartesian co-ordinate.

Continuing the example of FIG. 4, the feature tracking module 101A generates, using the feature map of the second video frame 402(2) and the binary crowd occupancy map 412 of the second video frame 402(2): a filtered feature map which contains the feature tracking information 408 for only those features that are in the human pixel positions for the second video frame 402(2). For example, the feature tracking module 101A generates the filtered feature map by performing element-wise multiplication of the feature map and the binary crowd occupancy map. Therefore, only the pixel locations of the feature map that correspond to human pixels remain in the filtered feature map.

Continuing the example, the feature tracking module 101A generates, using the second video frame 402(2), the first video frame 402(1), the filtered feature map of the second video frame 402(2), and the filtered feature map of the first video frame 402(1): feature tracking information 408 for each feature in the human pixel positions for the second video frame 402(2), including: i) feature location, ii) feature speed, iii) feature orientation, iv) total feature count. In an example, the feature tracking module 101A includes a KLT feature tracking module for detecting the same feature between the first video frame 402(1) and the second video frame 402(2), and generating the feature tracking information 408 of that feature (called KLT feature information).

In an example, the feature speed can be computed between a feature location of a feature in the second video frame 402(2) and the feature location of the same feature in the first video frame 402(1), and using a known time unit between the first video frame 402(1) and the second video frame 402(2). The feature orientation can be an angle computed between the feature location of the feature in the second video frame 402(2) and the feature location of the same feature in the first video frame 402(1). The feature orientation can be in degrees, radians, or other measurement units.

In the example of FIG. 4, the feature-crowd matching module 101C is configured to generate, using the feature tracking information 408 and the total human count: the crowd motion data 404. The crowd motion data 404 includes: i) human speed count, ii) human orientation count, iii) total human count, and iv) time.

In an example, the feature-crowd matching module 101C divides the total human count by the total feature count, arriving at an average number of features per human in the video frame 402. The feature-crowd matching module 101C generates (infers) the crowd motion data 404 from the average number of features per human and the feature tracking information. For example, if there are an average 5 features per human, then the feature-crowd matching module 101C can infer from the feature tracking information that clusters of 5 features in the same orientation and speed can be inferred as being a human for the purposes of generating the crowd motion data 404.

In an example, the generating of the crowd motion data 404 uses the feature tracking information 408 and total human count in the second video frame 402(2), and does not require particular knowledge of the previous crowd density map from the first video frame 402(1).

In the example of FIG. 4, the execution device 110 can also loop to receive the third video frame 402(3) of the video 400 and perform the crowd motion summarization method on the third video frame 402(3) (including generating feature tracking information 408 by comparing to the second video frame 402(2)), and so on.

In the example of FIG. 4, the data visualization module 101D generates, from the crowd motion data and the second video frame 402(2): visualization data 420. In some examples, the data visualization module 101D can directly receive the original video frame 402(2) and the time. In other examples, the original second video frame 402(2) and the time of the second video frame 402(2) are transmitted (cascaded) through any of the modules 101 (i.e., the feature tracking module 101A, the crowd occupancy detection module 101B, or the feature-crowd matching module 101C).

In some examples, the data visualization module 101D generates a first overlay of the crowd motion data 404 that is overlaid on the first video frame 402(1) or a second overlay of the crowd motion data 404 that is overlaid on the second video frame 402(2) (and further overlays for further video frames 402). In some examples, the data visualization module 101D generates, for display on the same display screen, the first overlay of the first video frame 402(1) and the second overlay of the second video frame 402(2) (or further overlays).

In some examples, the data visualization module 101D generates, from the crowd motion data 404, the crowd motion data 404 in a form that can be visualized as the visualization data 420, such as histograms, tables, summaries, charts, graphs, etc.

As shown in FIG. 3, the visualization data 420 can include a histogram of motion summaries 406, as follows: first histogram 406(1) of human speed, time, human speed count; and second histogram 406(2) of human orientation, time, human orientation count.

In some examples, the data visualization module 101D detects an event from the crowd motion data 404, and generates an event indication as an output that indicates occurrence of the event.

The data visualization module 101D generates the crowd motion data 404 for the subsequent frames, e.g. third video frame 402(3) and so on. The feature speed can be computed between a feature location of a feature in the third video frame 402(3) and the feature location of the same feature in the second video frame 402(2), and using the known time unit between video frames. The feature orientation can be an angle computed between the feature location of the feature in the third video frame 402(3) and the feature location of the same feature in the second video frame 402(2). The data visualization module 101D generates crowd motion data 404 for the third video frame 402(3). In some examples, the feature speed and the feature orientation for the third video frame 402(2) can be generated in relation to any of the previous video frames, e.g. versus the first video frame 402(1) (e.g. to generate crowd motion data 404 of longer term trends or time-elapsed type analysis).

The crowd motion data 404 generated by the data visualization module 101D can be displayed on a display screen or transmitted to the user equipment 140 in near real-time, as-needed, as soon as the crowd motion data 404 is generated for the third video frame 402(3) and each subsequent video frame 402(n).

The video frame 402 can be an image map which can contains humans and non-human objects. A pixel value of the video frame 402 may be a red, green, and blue (RGB) color value. The pixel value may be a long integer indicating a color. For example, a pixel value is 255*Red+100*Green+76*Blue, where Blue represents a bit shift of a blue component, Green represents a bit shift of a green component, and Red represents a bit shift of a red component. 255, 100, and 76 are the respective coefficients of Red, Green, and Blue. In a 24-bit color representation, Red is shifted by 16 bits (65,536) and Green is shifted by 8 bits (256), and Blue is shifted by 0 bits (1). In all the color components, a smaller coefficient indicates lower brightness, and a larger coefficient indicates higher brightness. For a grayscale image, the pixel value may be a grayscale value (e.g., 0 to 255). For a black and white image (binary map), the pixel value may be a binary value such as 0 and 1, or 0 and 255. In some examples, a mask image is generated from the video frame 402, in which the mask image is a representation of one or more particular objects in the video frame 402 in which pixels of a particular object are filled in a single color, and the remaining pixels are white (zero). In some examples, a segmentation image (outline or edges) is generated from the video frame 402, in which the outline image is a representation of one or more particular objects in the video frame 402 in which pixels of a particular object are defined with lines (outline or edges) in a single color, and the remaining pixels are white (zero).

FIG. 5 is an example detail flow diagram of human detection from the video frame 402 performed by the crowd occupancy detection module 101B in accordance with an example embodiment. The crowd occupancy detection module 101B includes a crowd density estimation module 502, a human localization module 506, a binary threshold module 508, and a morphological transformation module 512.

The execution device 110 receives a video frame 402 of the video 400, such as the second video frame 402(2) (FIG. 3). The video frame 402 can also include time information. The crowd density estimation module 502 generates, using the video frame 402, a crowd density map 504. The crowd density map 504 includes pixels that each indicate a probability of the human location of a human detected in the video frame 402. The sum total of probabilities in a cluster of pixels can be used to identify the probably that the cluster is a human.

The human localization module 506 generates, using the crowd density map 506: the human localization information 410 of humans detected in the video frame 402. The human localization information 410 can include: crowd density map of the video frame 402, and total human count in the video frame 402.

The binary threshold module 508 generates, from the crowd density map 504: a threshold binary crowd occupancy map 510. The binary threshold module 508 applies a threshold to the threshold binary crowd occupancy map 510, and maintains pixels values of the crowd density map 504 that have a probability that exceeds the threshold. All other pixel locations are assigned a zero pixel value. Therefore, the threshold binary crowd occupancy map 510 has human pixels which indicate probable pixel positions of a human (or a human head in some examples).

The morphological transformation module 512 generates, from the threshold binary crowd occupancy map 510: the binary crowd occupancy map 412. The morphological transformation module 512 accounts for morphological human features of each human pixel of the threshold binary crowd occupancy map. For example, when only each human head is detected and indicated as a human pixel, the morphological transformation module 512 dilates the human pixel of the human head in order to account for the remainder of the body of the human. In an example, the morphological transformation module 512 includes a dilation module configured to dilate the human pixels which indicate the human location. For example, the dilation module can implement a convolution function with a M×M block (M>1) having values of 1 onto the threshold binary crowd occupancy map 510. In other examples, a circle-shaped block having values of 1 is used for the convolution function. The dilation module also assists in creating a buffer so as to capture some addition pixels surrounding the human or the human head.

The binary crowd occupancy map 412 generated by the morphological transformation module 512 has human pixel positions which indicate the human location versus the non-human location. The binary crowd occupancy map 412 can be element-wise multiplied with the feature map to generate a filtered feature map, so that only the features relating to human pixel positions remain in the filtered feature map.

The crowd density estimation module 502 can include a human density estimation module. Other human or human head detection modules may be used in other examples, such as human instance segmentation models. The human or human head detection module can be trained with labelled images containing humans or human heads.

In an example, the crowd occupancy detection module 101B (including the crowd density estimation module 502, the human localization module 506, the binary threshold module 508, and the morphological transformation module 512) do not require processing of the previous video frame or the previous human localization information 410 generated from the previous video frame. Rather, the crowd occupancy detection module 101B can receive the video frame 402 as input without requiring input of the previous video frame or any previous human localization information 410.

FIG. 6 is a detail flow diagram of feature tracking of the video frame 402 performed by the feature tracking module 101A in accordance with an example embodiment. The feature tracking module 101A is configured to detect features in the video frame 402, such as feature points (also known as feature edge points, KLT corners or Harris corners) of visual features of particular edges detected from the video frame 402(1). The feature tracking module 101A is configured to generate the feature tracking information 408 of the detected features (feature points), including feature orientation and feature speed. In the example of FIG. 6, the feature tracking module 101A includes a KLT feature extraction module 602, an element-wise multiplication module 606, a KLT feature tracking module 610, and a speed and orientation estimator module 614.

The KLT feature extraction module 602 receives one of the video frames 402, for example the second video frame 402(2). The KLT feature extraction module 602 generates, from the video frame, a KLT feature map 604. The KLT feature map 604 indicates each feature location of each KLT feature detected by the KLT feature extraction module 602 as a pixel (edge point). In other examples, each generated feature location is represented by a Cartesian co-ordinate.

Continuing with the example of FIG. 6, the element-wise multiplication module 606 performs element-wise multiplication on the KLT feature map 604 and the binary crowd occupancy map 412, generating a filtered KLT feature map 608. Therefore, the KLT filtered feature map 608 contains the feature points for only those features that are in the human pixel positions for the video frame 402. For example, the element-wise multiplication module 606 generates the filtered feature map by performing element-wise multiplication (also known as Hadamard product) of the KLT feature map 604 and the binary crowd occupancy map 412. Therefore, only the pixel locations of the KLT feature map 604 that correspond to human pixels remain in the filtered KLT feature map 608.

Note that a filtered KLT feature map 608 can also be previously generated for the first video frame 402(1) in a similar manner, denoted first filtered KLT feature map 608. The filtered KLT feature map 608 for the second video frame 402(2) is denoted second filtered KLT feature map 608.

Continuing the example, the KLT feature tracking module 610 generates, using the first video frame 402(1), the second video frame 402(2), the first filtered KLT feature map 608 of the first video frame 402(1), and the second filtered KLT feature map 608 of the second video frame 402(2): feature tracklets 612 for each feature detected in the second video frame 402(2). Feature tracklets are vectors (directed line segments) between the feature point of the first filtered KLT feature map 608 and the same feature point detected in the second filtered KLT feature map 608. Each feature tracklet can be in the form of a vector or an ordered pair of Cartesian co-ordinates, and can be visualized as a vector line segment on the original video frame 402.

The speed and orientation estimator module 614 is used to generate feature tracking information 408 from the feature tracklets 612, for each feature in the human pixel positions for the second video frame 402(2). The tracking information includes: i) feature location, ii) feature speed, iii) feature orientation and iv) total feature count. The feature location is the feature location in the second video frame 402(2) in this example.

In an example, the feature speed can be computed between the two feature locations of each tracklet (vector) in the feature tracklets 612, and optionally using a known time unit between the first video frame 402(1) and the second video frame 402(2). In an example, the feature speed for the $i^{th}$ feature is calculated as:

$$M^i = \sqrt{(x_n^i - x_{n-1}^i)^2 + (y_n^i - y_{n-1}^i)^2}, \quad \text{(Equation 1)}$$

wherein (x, y) are Cartesian co-ordinates of the feature location for the $i^{th}$ feature, n is the subject video frame (second video frame 402(2) in this example), and n−1 is the previous video frame (first video frame 402(1) in this example).

The feature orientation can be an angle computed between the two feature locations of each tracklet (vector) in the feature tracklets 612. The feature orientation can be in degrees, radians, or other measurement units. In an example, the feature orientation for an $i^{th}$ feature is calculated as:

$$\theta^i = \arctan\frac{(y_n^i - y_{n-1}^i)}{(x_n^i - x_{n-1}^i)},$$ (Equation 2)

wherein (x, y) are Cartesian co-ordinates of the feature location for the $i^{th}$ feature, n is the subject video frame, and n−1 is the previous video frame.

Referring again to FIG. 4, the feature-crowd matching module 101C matches human localization information with the detected features. In the example of FIG. 4, the feature-crowd matching module 101C is configured to generate, using the feature tracking information 408 and the total human count: the crowd motion data 404. The crowd motion data 404 includes: i) human speed count, ii) human orientation count, iii) total human count, and iv) time. In an example, the feature-crowd matching module 101C divides the total human count by the total feature count, arriving at an average number of features per human in the second video frame 402(2). In an example, the feature-crowd matching module 101C generates (infers) the number of features per human. The feature-crowd matching module 101C generates (infers) the crowd motion data 404 from the number of features per human and the feature tracking information.

Figure 7:
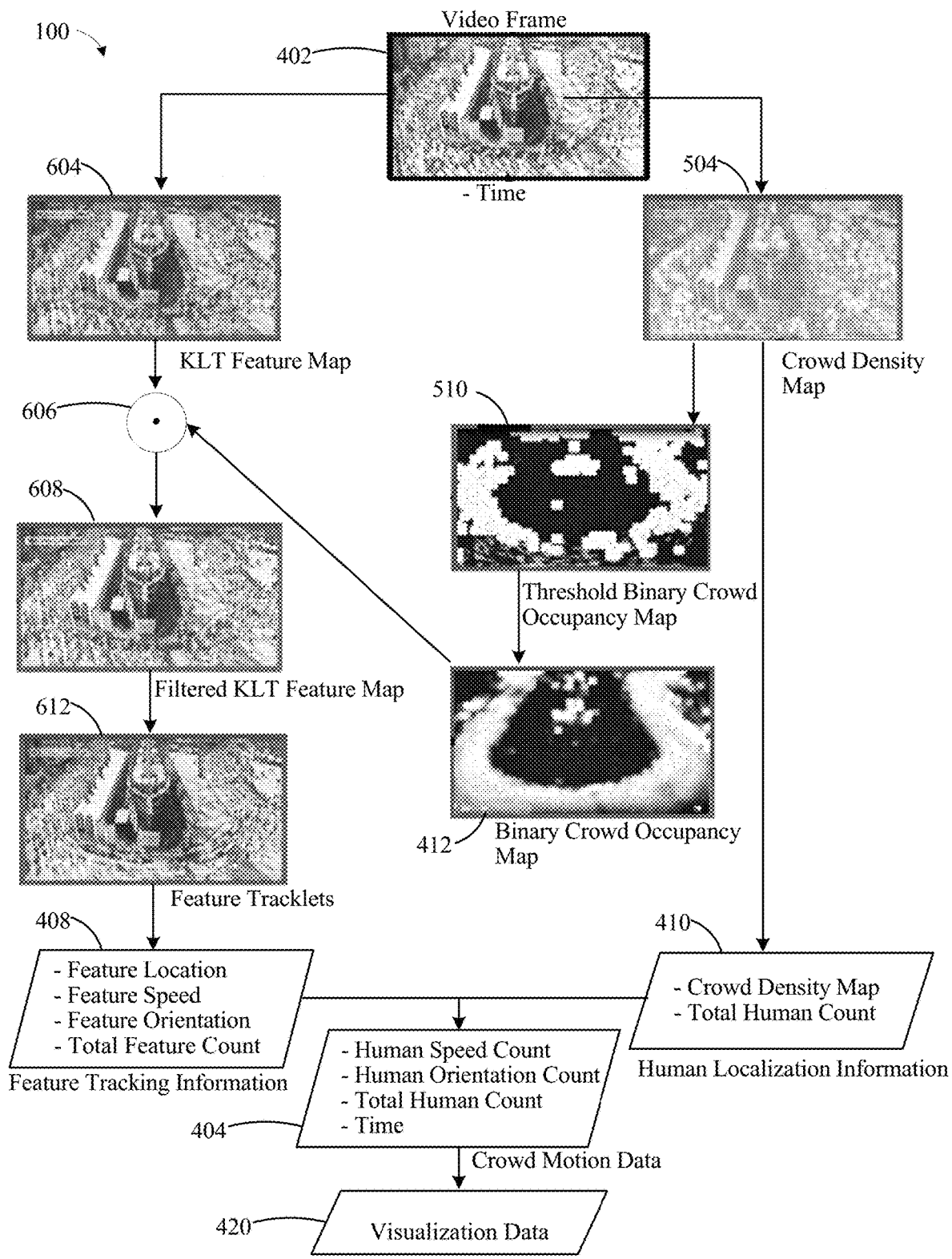
FIG. 7 is a detail pictorial representation of data generated by each module of the crowd motion summarization system, in accordance with an example embodiment.

FIG. 7 is a detail pictorial representation of maps, data and information generated by each module of the crowd motion summarization system 100, in accordance with an example embodiment. The crowd density estimation module 502 receives the video frame 402 and time information of the video frame 402. For example, the video frame 402 is the second video frame 402(2). The crowd density estimation module 502 generates, using the video frame 402: the crowd density map 504. The crowd density map 504 includes pixels that each indicate a probability of the human location of a human detected in the video frame 402.

The human localization module 506 generates, using the crowd density map 504: the human localization information 410 of humans detected in the video frame 402. The human localization information 410 can include the total human count and the crowd density map 504.

The binary threshold module 508 generates, from the crowd density map 504, the threshold binary crowd occupancy map 510. The binary threshold module 508 applies a threshold to the threshold binary crowd occupancy map 510, and maintains pixels values of the crowd density map 504 that have a probability that exceeds the threshold. All other pixel locations are assigned a zero pixel value.

The morphological transformation module 512 generates, from the threshold binary crowd occupancy map 510, the binary crowd occupancy map 412 which includes human pixel positions which indicate the human location. For example, the morphological transformation module 512 includes a dilation module configured to dilate the human pixels which indicate the human location.

The KLT feature extraction module 602 of the feature tracking module 101A is configured to detect features in the video frame 402, such as feature points, and generate the KLT feature map 604.

The element-wise multiplication module 606 performs element-wise multiplication on the KLT feature map 604 and the binary crowd occupancy map 412, generating the filtered KLT feature map 608. Therefore, the KLT filtered feature map 608 contains the feature points for only those features that are in the human pixel positions for the video frame 402.

Note that the first filtered KLT feature map 608 can also be previously generated for the first video frame 402(1) in a similar manner, not shown here. The KLT feature tracking module 610 generates, using the first video frame 402(1), the second video frame (402(2)), a first filtered KLT feature map 608 (not shown here) of the first video frame 402(1), and the second filtered KLT feature map 608 of the second video frame 402(2): feature tracklets 612 for each feature detected in the second video frame 402(2). Each feature tracklet can be a vector line segment, in which the feature tracklets 612 can be overlaid on the original second video frame 402(2), as shown in FIG. 7.

The speed and orientation estimator module 614 is used to generate feature tracking information 408 from the feature tracklets 612, including: i) feature location, ii) feature speed, and iii) feature orientation, and iv) total feature count. The feature location is the feature location in the second video frame 402(2) in this example.

Continuing with the example of FIG. 7, the feature-crowd matching module 101C matches human localization information with the detected features. In the example of FIG. 4, the feature-crowd matching module 101C is configured to generate, using the feature tracking information 408 and the total human count: the crowd motion data 404. The crowd motion data includes: i) human speed count, ii) human orientation count, iii) total human count, and iv) time. In an example, the feature-crowd matching module 101C divides the total human count by the total feature count, arriving at an average number of features per human in the video frame 402. The feature-crowd matching module 101C generates (infers) the crowd motion data 404 from the average number of features per human and the feature tracking information.

The data visualization module 101D generates the visualization data 420 from the crowd motion data 404.

Figure 8:
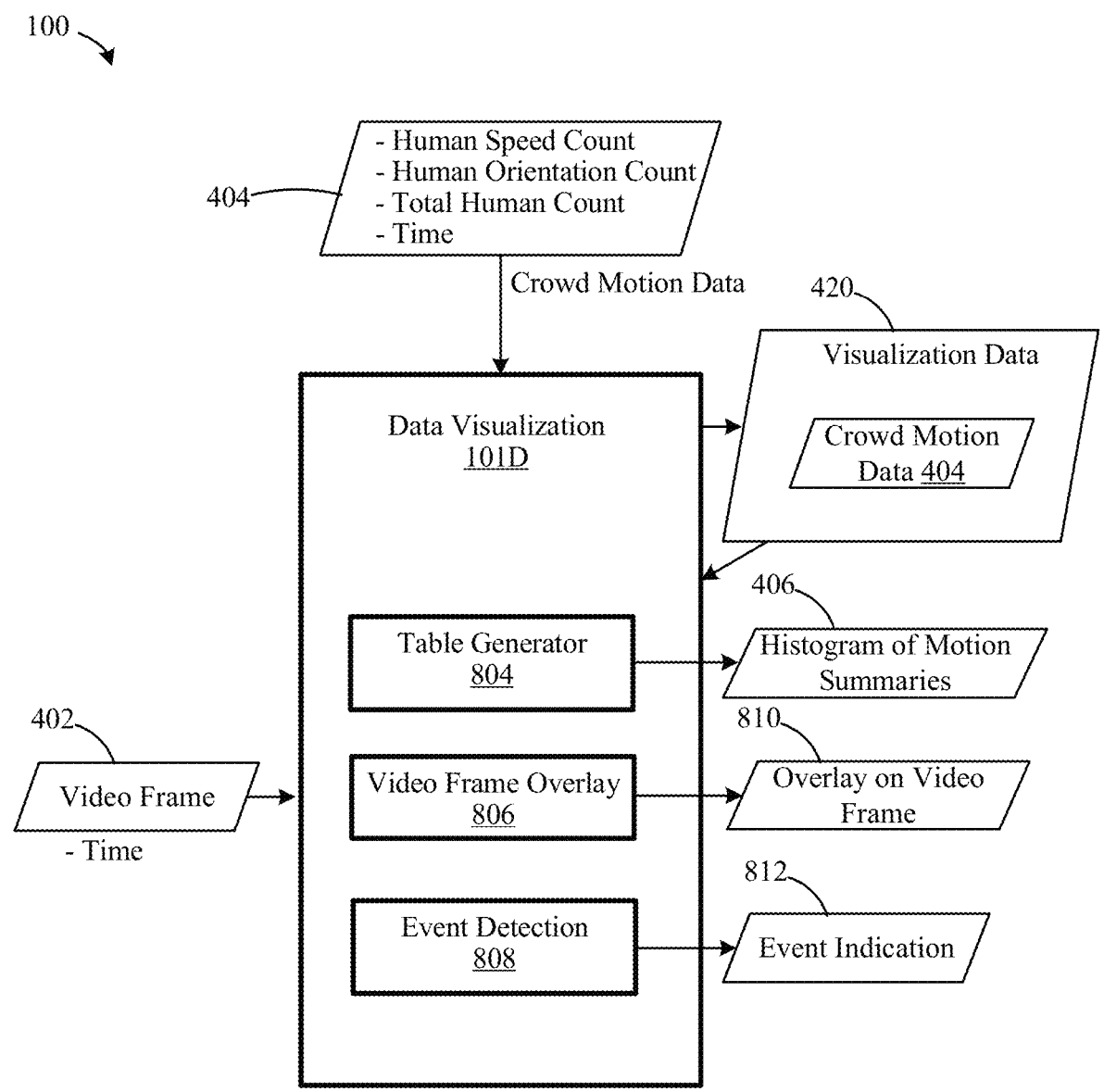
FIG. 8 is a schematic diagram of a data visualization module of the crowd motion summarization system, in accordance with an example embodiment.

FIG. 8 is a schematic diagram of the data visualization module 101D, in accordance with an example embodiment. The data visualization module 101D receives the crowd motion data 404, which includes: i) human speed count, ii) human orientation count, iii) total human count, and iv) time. The data visualization module 101D also receives the video frame 402 and (optionally) the time of the video frame 402, either directly or are transmitted (cascaded) through any of the modules 101 (feature tracking module 101A, crowd occupancy detection module 101B, or feature-crowd matching module 101C).

The data visualization module 101D generates the visualization data 404 from the crowd motion data 404. The visualization data 404 can also include the crowd motion data 404. In some examples, the data visualization module 101D also includes a table generator module 804, a video frame overlay module 806, and an event detection module 808.

Figure 9:
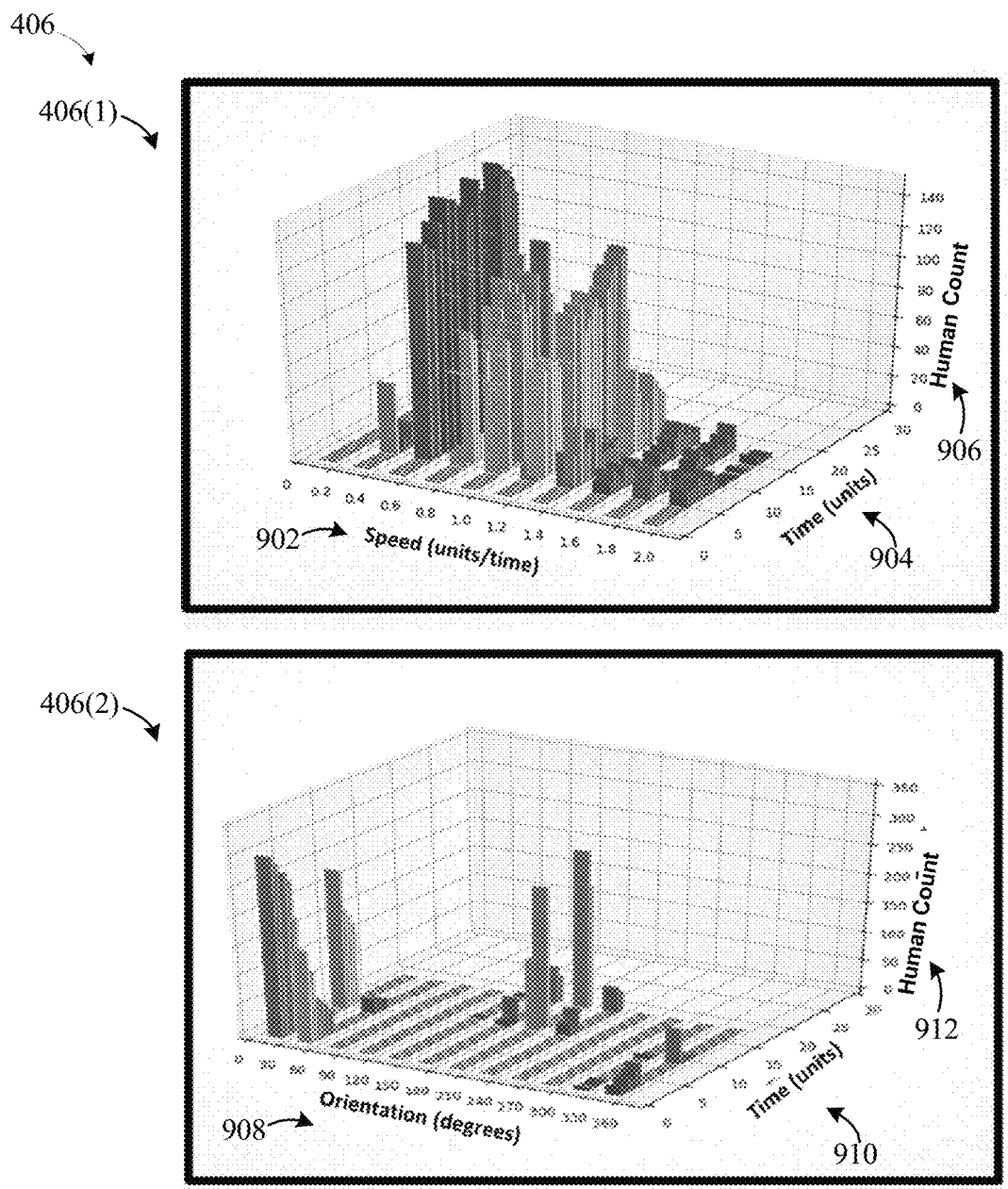
FIG. 9 illustrates an example histogram of motion summaries generated by the data visualization module.

In some examples, the table generator module 804 generates histograms, tables, summaries, charts, graphs, etc., from the crowd motion data 404 (or the visualization data 404, which can be interchangeably used depending on the configuration). As shown in FIG. 8, the table generator module 804 can generate a histogram of motion summaries 406, which is illustrated in FIG. 9. As shown in FIG. 9, the histogram of motion summaries 406 includes: first histogram 406(1) of human speed 902, time 904, human speed count 906; and second histogram 406(2) of human orientation 908, time 910, human orientation count 912. In some examples, the histogram of motion summaries 406 is generated such that the first histogram 406(1) and the second histogram 406(2) are displayed by the user equipment 140 on the same display screen. In some examples, the histogram of motion summaries 406 is generated, updated and displayed by the user equipment 140 in near real-time, as-needed, as more video frames 402 are received by the crowd motion summarization method and more crowd motion data 404 is received by the data visualization module 101D.

The histogram of motion summaries 406 combines crowd motion and person counts to create a rich descriptor for crowds in the video 400. The histogram of motion summaries 40 amenable to a number of applications, including: i) crowd anomaly detection for public safety (e.g., stampeding, diverging, converging, sudden changes in speed/direction, crowd panic, moving in wrong direction, sudden changes in crowd size); ii) unauthorized access (e.g., detecting non-zero person counts in out-of-bounds areas); iii) congestion control (e.g., overcrowding prevention); iv) attendance analytics (e.g., number of people attending an event, performance, or concert); and v) shopping analytics and store design (e.g., crowd counts, dwell times, and movement speeds adjacent to various products and advertisements).

In the example of FIG. 8, the video frame overlay module 806 generates, from the crowd motion data 404, an overlay 810 of the crowd motion data 404 that is overlaid on the video frame 402, such as the second video frame 402(2) (and further overlays 810 for further video frames 402(n)). In some examples, the overlay 810 generated by the overlay module 806 can be separate data or metadata of the video frame 402, or in other examples can be overlaid on the video frame 402 and generated (saved) as a new video frame file.

Figure 10:
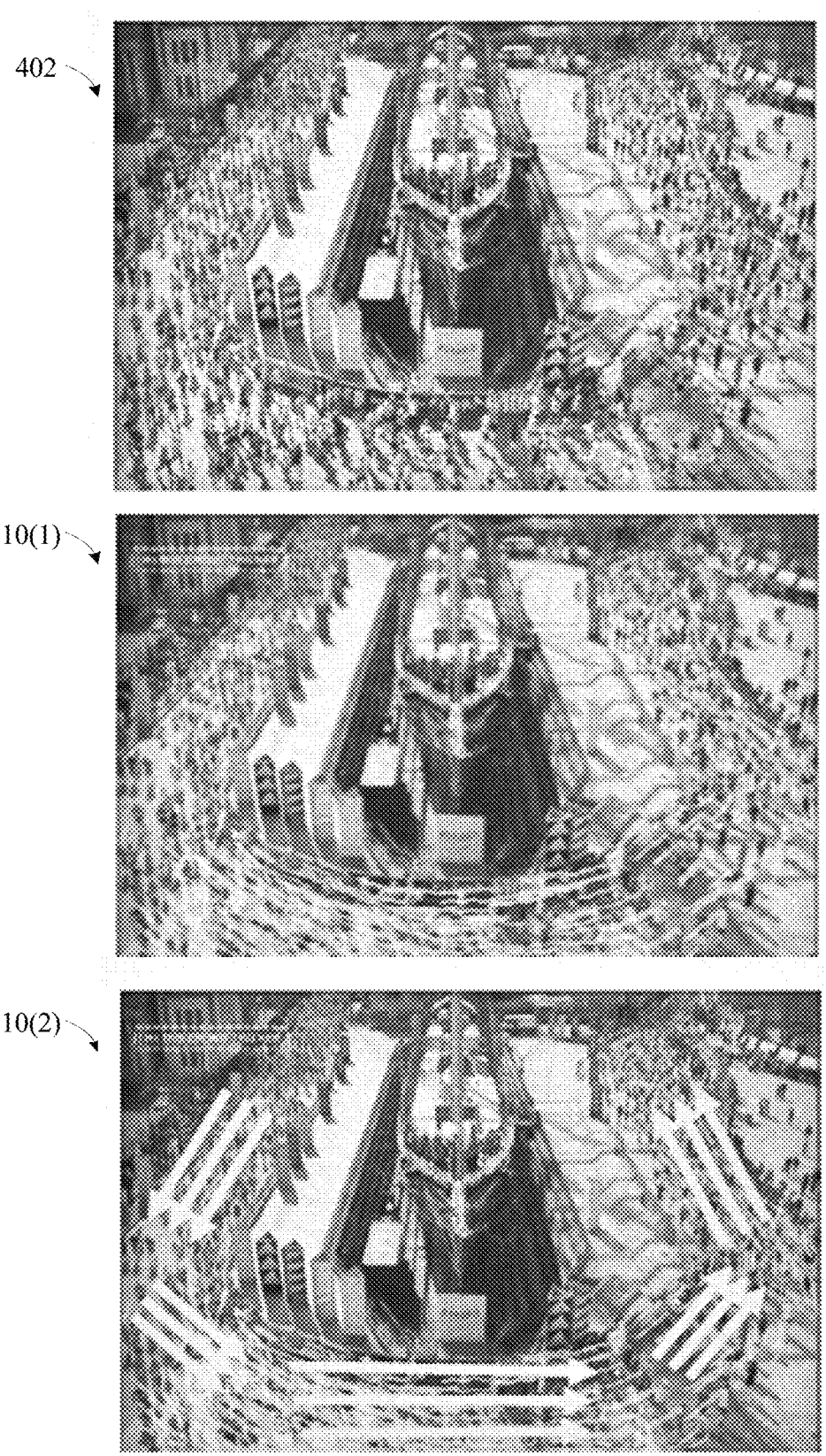
FIG. 10 illustrates an example overlay of a video frame generated by the data visualization module.

FIG. 10 illustrates an example of the overlay on the video frame 402 generated by the data visualization module 101D. A first overlay 810(1) is displayed on the video frame 402, which illustrates the feature tracklets 612 (FIG. 6) in the subject video frame 402. The feature tracklets 612 are only those of humans, and not other non-human objects or background. Therefore, other non-human features or features of non-human moving distractors are not generated in the first overlay 810(1).

FIG. 10 also illustrates a second overlay 810(2) displayed on the video frame 402, which illustrates the total human count and total human orientation for particular segments of the video frame 402. For example, the video frame 402 can be segmented into 3×2 segments in the present example. The size and number of the particular segments can be manually set in some examples. In other examples, the particular segments are generated by a data visualization model. The second overlay 810(2) includes large arrows which indicate the human speed count and the human orientation count at the particular segments of the video frame 402.

In the example of FIG. 8, the event detection module 808 generates an event indication 812 from the crowd motion data 404. In some examples, the event indication 812 as output to the user equipment 140, and the user equipment 140 is configured to output (e.g., through the display screen, a speaker, or a transmission) the event indication 812. Examples of the event indication 812 are described next in relation to FIGS. 11A, 11B, 11C and 11D.

Figure 11A:
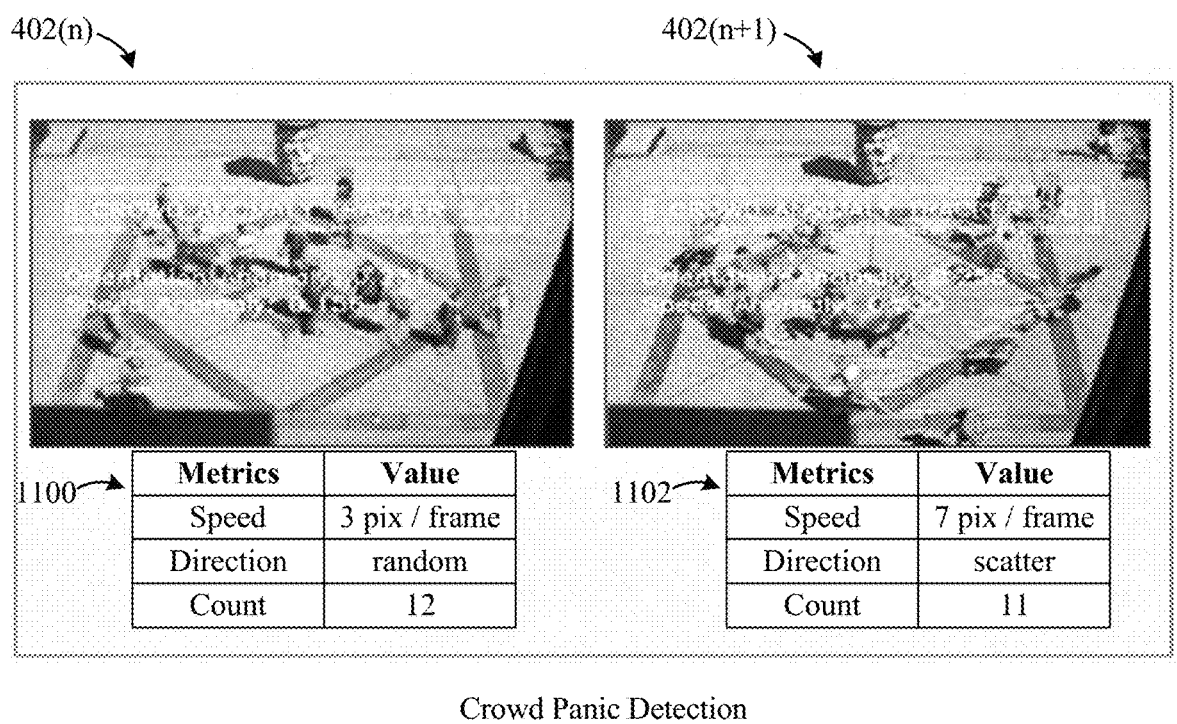
FIG. 11A illustrates an example of two sequential video frames overlaid with crowd motion data representing crowd panic detection, generated by the data visualization module.

FIG. 11A illustrates an example of two sequential video frames overlaid with crowd motion data 404 representing crowd panic detection, generated by the data visualization module 101D. The event detection module 808 generates, from the crowd motion data 404, an event indication 812 of crowd panic detection. The video frame overlay module 806 generates, from the crowd motion data 404, a first overlay of a subject video frame 402(n) and a second overlay of subsequent video frame 402(n+1), in which the subsequent video frame 402(n+1) is subsequent to the subject video frame 402(n). The first overlay and the second overlay both include feature tracklets. The table generator module 804 generates a first table 1100 of the crowd motion data 404 of the subject video frame 402(n) and a second table 1102 of the crowd motion data of the subsequent video frame 402(n+1). The event detection module 808 generates, from the crowd motion data 404, the event indication 812 of crowd panic detection when the orientation (direction) of the humans is scattered and the speed count increases for a higher speed. Scatters means the humans are moving away from a particular position.

In FIG. 11A, the first table 1100 of the subject video frame 402(n) shows a speed of 3 pixels/frame and a speed count for the 3 pixels/frame is 12 humans, and the orientation is random. The second table 1102 of the subsequent video frame 402(n+1) shows an increased speed of 7 pixels/frame and a speed count for the 2 pixels/frame of 11 humans, and the orientation is scatter.

Figure 11B:
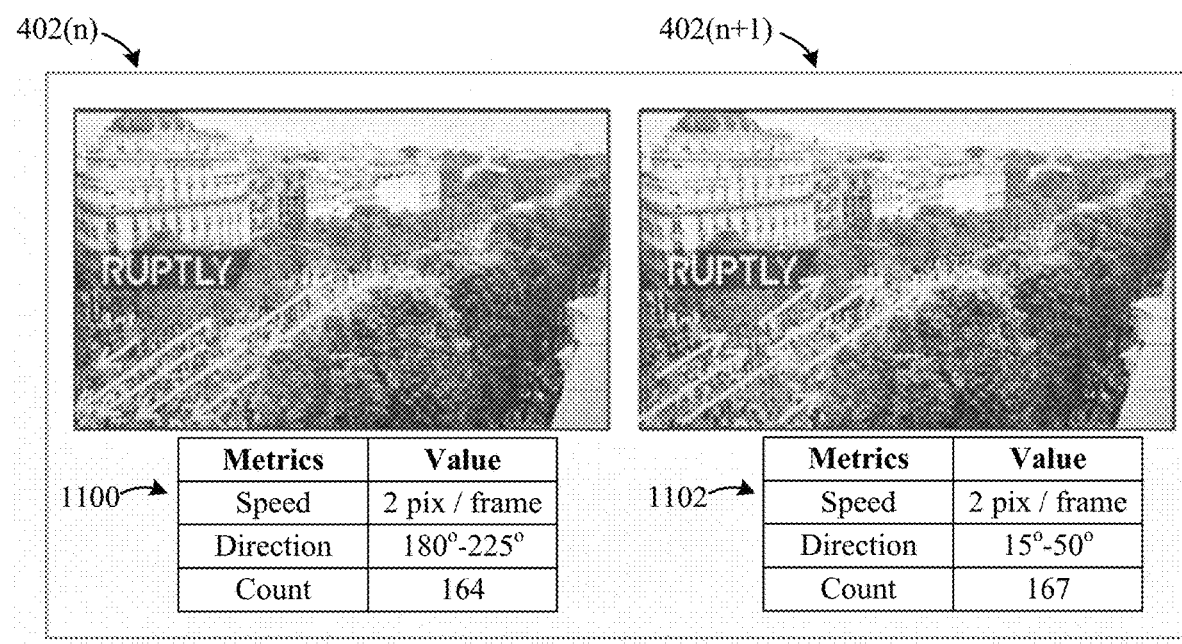
FIG. 11B illustrates an example of two sequential video frames overlaid with crowd motion data representing crowd moving in wrong direction detection, generated by the data visualization module.

FIG. 11B illustrates an example of two sequential video frames overlaid with crowd motion data representing crowd moving in wrong direction detection, generated by the data visualization module 101D. The event detection module 808 generates, from the crowd motion data 404, an event indication 812 of the crowd moving in wrong direction detection. The video frame overlay module 806 generates, from the crowd motion data 404, a first overlay of a subject video frame 402(n) and a second overlay of subsequent video frame 402(n+1), in which the subsequent video frame 402(n+1) is subsequent to the subject video frame 402(n). The first overlay and the second overlay each include feature tracklets. The table generator module 804 generates a first table 1100 of the crowd motion data 404 of the subject video frame 402(n) and a second table 1102 of the crowd motion data 404 of the subsequent video frame 402(n+1). The event detection module 808 generates, from the crowd motion data 404, the event indication 812 of crowd moving in wrong direction detection when the orientation (direction) of the humans is generally in the opposite orientation as the original video frame 402(n).

In FIG. 11B, the first table 1100 of the subject video frame 402(n) shows a speed of 2 pixels/frame and a speed count for the 2 pixels/frame is 164 humans. The second table 1102 of the subsequent video frame 402(n+1) shows a speed of 2 pixels/frame and a speed count for the 2 pixels/frame of 167 humans.

Figure 11C:
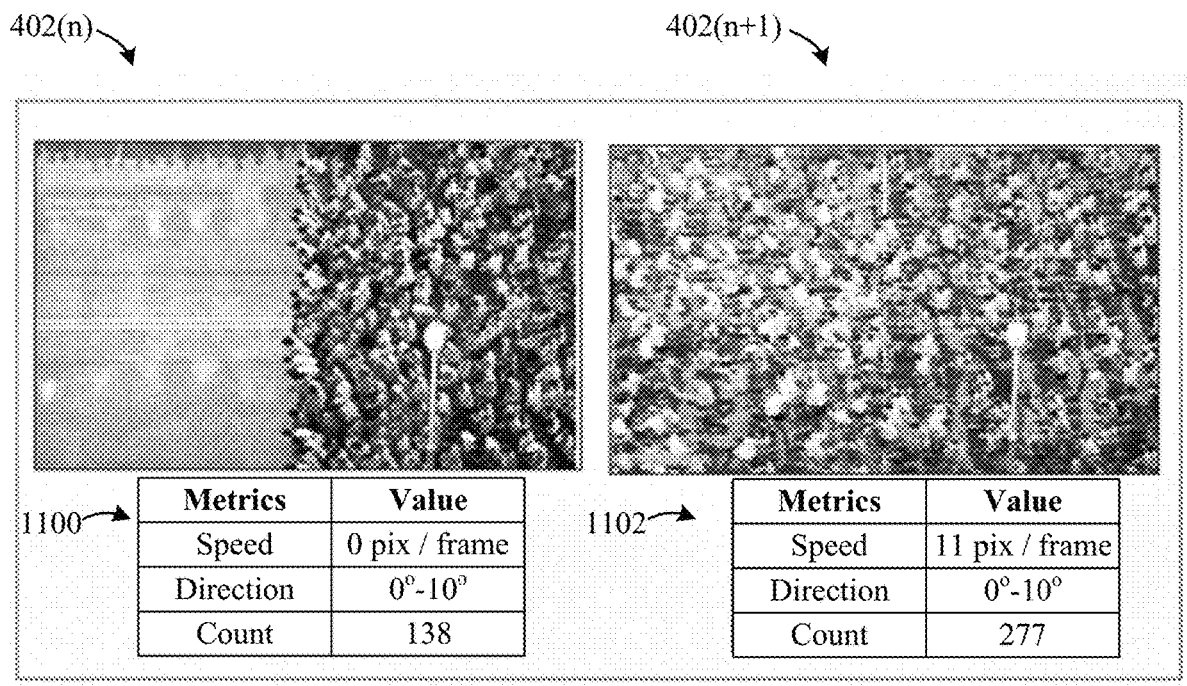
FIG. 11C illustrates an example of two sequential video frames overlaid with crowd motion data representing crowd stampede detection, generated by the data visualization module.

FIG. 11C illustrates an example of two sequential video frames overlaid with crowd motion data representing crowd stampede detection, generated by the data visualization module 101D. The event detection module 808 generates, from the crowd motion data 404, an event indication 812 of the crowd stampede detection. The video frame overlay module 806 generates, from the crowd motion data 404, a first overlay of a subject video frame 402(n) and a second overlay of subsequent video frame 402(n+1), in which the subsequent video frame 402(n+1) is subsequent to the subject video frame 402(n). The first overlay and the second overlay both include feature tracklets. The table generator module 804 generates a first table 1100 of the crowd motion data 404 of the subject video frame 402(n) and a second table 1102 of the crowd motion data 404 of the subsequent video frame 402(n+1). The event detection module 808 generates, from the crowd motion data 404, the event indication 812 of crowd stampede detection when the speed count of a high speed of the humans increases within a short time, all in a single orientation (direction). The first table 1100 of the subject video frame 402(n) shows a speed of 0. Note that the feature tracklet for a speed of zero in the first overlay can be represented by a dot, rather than a vector line segment. The second table 1102 of the subsequent video frame 402(n+1) shows a speed of 11 pixels/frame and a speed count for the 11 pixels/frame is 277 humans. An example of crowd stampede detection is the start of a running race.

Figure 11D:
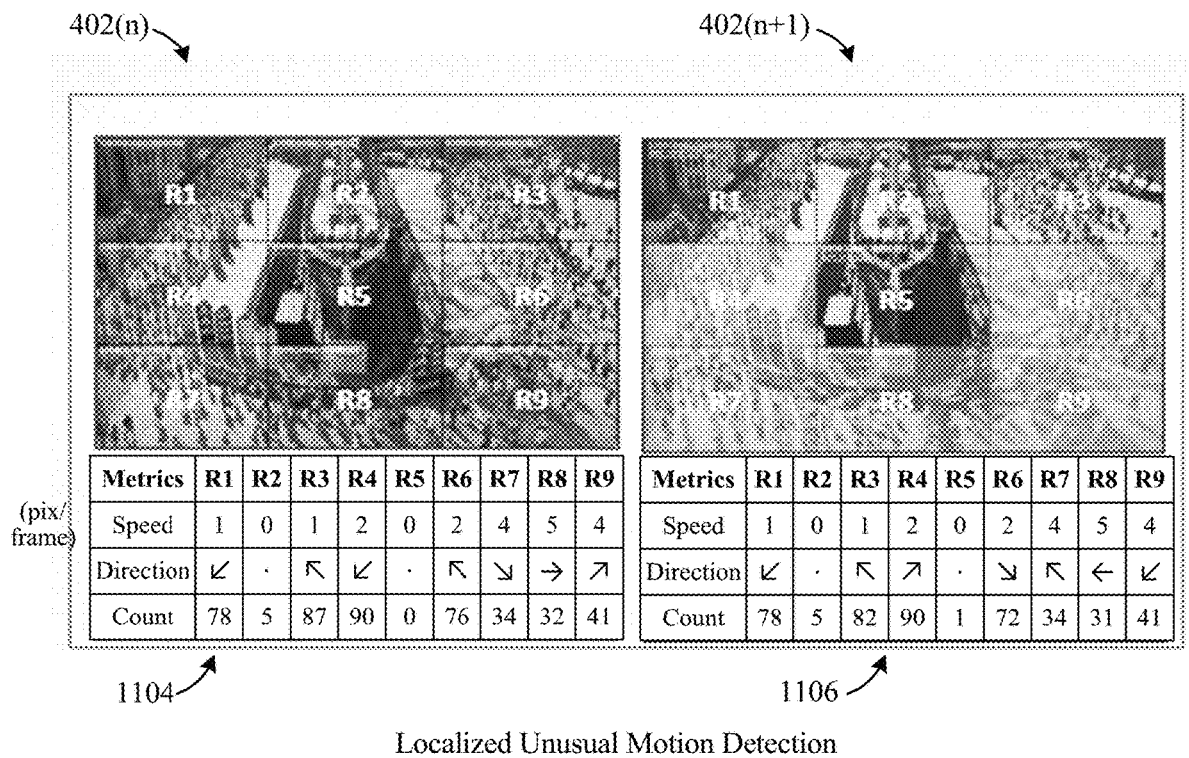
FIG. 11D illustrates an example of two sequential video frames overlaid with crowd motion data representing localized unusual crowd motion detection, generated by the data visualization module.

FIG. 11D illustrates an example of two sequential video frames overlaid with crowd motion data 404 representing localized unusual crowd motion detection, generated by the data visualization module 101D. The event detection module 808 generates, from the crowd motion data 404, an event indication 812 of the localized unusual crowd motion detection. FIG. 11D illustrates the total human count and total human orientation for particular segments of the video frame 402. For example, the video frame 402 can be segmented into 3×3 segments in the present example. The segments are labeled R1 to R9 in the present example. The size and number of the particular segments can be manually set in some examples. In other examples, the particular segments are generated by a data visualization model.

The video frame overlay module 806 generates, from the crowd motion data 404, a first overlay of a subject video frame 402(n) and a second overlay of subsequent video frame 402(n+1), in which the subsequent video frame 402(n+1) is subsequent to the subject video frame 402(n). The first overlay and the second overlay both include feature tracklets. The table generator module 804 generates a first table 1104 of the crowd motion data 404 of the subject video frame 402(n) and a second table 1106 of the crowd motion data of the subsequent video frame 402(n+1). The event detection module 808 generates, from the crowd motion data 404, the event indication 812 of localized unusual crowd motion detection when the orientation (direction) of the humans in one of the segments is generally in the opposite orientation as the original video frame 402(n). In the present example, the crowd motion data 404 of the original video frame 402(n) is generally the humans moving in an orientation of a counter-clockwise direction. In the present example, there is localized unusual crowd motion detection in segments R4, R6, R7, R8 and R9 of the subsequent video frame 402(n+1).

It would be appreciated that the described crowd motion summarization system and crowd motion summarization method can be used for different levels of crowd density, different crowd group sizes, camera placements, and standard perspective effects.

The crowd motion summarization system and crowd motion summarization method can be used in a variety of applications. For example, there are numerous traffic cameras around the world and there are numerous roads and traffic intersections that could benefit from the crowd motion summarization method.

There are roughly 500 cities with a population over 1 million, where the crowd motion summarization method would benefit the municipalities (e.g., public safety, urban planning).

There are more than 10,000 airports in the world that offer jet-based passenger services that could use AI enhanced cameras for crowd management in view of the crowd motion data provided by the crowd motion summarization method.

There are over 250 shopping malls with at least 100,000 m² of gross leasable area, where cameras enabled with the crowd motion summarization method could assist with store design to increase profits.

There are over 500 stadiums and 250 indoor arenas in the world with seating capacities over 40,000 and 15,000, respectively, where smart cameras enabled with the crowd motion summarization method could be used for ensuring crowd safety.

The user equipment 140 can be a remote terminal in a remote location to the camera 142. The remote terminal can have one or more display screens for displaying crowd motion data of one or more of the cameras 142. Other examples of the user equipment 140 can be used for crowd control, consumer traffic summarizing, hospital emergency room traffic summarizing, infrastructure construction planning, smart city movement summarizing, etc.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the technical solutions may be implemented in a form of a software product. The software product is stored in a storage medium, and includes several instructions for instructing user equipment or a computer device to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

The foregoing descriptions are merely specific implementations, but are not intended to limit the scope of protection. Any variation or replacement readily figured out by a person skilled in the art within the technical scope shall fall within the scope of protection. Therefore, the scope of protection shall be subject to the protection scope of the claims.

What is claimed is:

1. A crowd motion summarization method, comprising:
   receiving a video frame;
   generating, using a crowd occupancy detection module and the video frame: a binary crowd occupancy map of the video frame having human pixel positions which indicate human location versus non-human location, and a total human count of humans detected in the video frame, the generating the binary crowd occupancy map including:
   generating, using a crowd density estimating module and the video frame: a crowd density map which includes a probability of the human location,
   generating, using a binary threshold module and the crowd density map: a threshold binary crowd occupancy map of the crowd density map for the probability that exceeds a threshold, the threshold binary crowd occupancy map having the human pixel positions which indicate the human location versus the non-human location, and
   generating, using a morphological transformation module and the threshold binary crowd occupancy map: the binary crowd occupancy map from the threshold binary crowd occupancy map which accounts for morphological human features;
   generating, using a feature tracking module and the video frame: a feature map including feature location of features detected in the video frame;
   generating, using the feature tracking module, the feature map, the binary crowd occupancy map, the video frame, a previous video frame, and previous feature location of previous features detected from the previous video frame: feature tracking information for only each feature in the human pixel positions for the video frame, including: i) the feature location, ii) feature speed, iii) feature orientation, and iv) total feature count; and
   generating, using a feature-crowd matching module, the feature tracking information, and the total human count: crowd motion data including: i) a human speed count of at least one human speed, ii) a human orientation count of at least one human orientation.

2. The crowd motion summarization method as claimed in claim 1, wherein the crowd motion data further includes: iii) time of the video frame, the method further comprising generating, using a data visualization module and the crowd motion data: visualization data of the crowd motion data.

3. The crowd motion summarization method as claimed in claim 2, further comprising generating, using the data visualization module: the visualization data including at least one table which includes the human speed count and the human orientation count.

4. The crowd motion summarization method as claimed in claim 2, further comprising generating, using the data visualization module: the visualization data including at least one table which includes: i) the human speed count, ii) the human orientation count, and iii) the time of the video frame.

5. The crowd motion summarization method as claimed in claim 4, further comprising generating the visualization data for at least one other video frame, wherein the at least one table further includes: a first histogram of the human speed count, the human speed, and the time, and a second histogram of the human orientation count, the human orientation, and the time.

6. The crowd motion summarization method as claimed in claim 2, further comprising generating, using the data visualization module and the video frame: a first overlay of the video frame with the crowd motion data overlaid on the video frame.

7. The crowd motion summarization method as claimed in claim 6, further comprising generating, using the data visualization module and the previous video frame: a second overlay of the previous video frame with previous crowd motion data overlaid on the previous video frame; and generating the crowd motion data to display the first overlay and the second overlay on a same display screen.

8. The crowd motion summarization method as claimed in claim 2, wherein the generating the crowd motion data is performed in near real-time when the video frame is received.

9. The crowd motion summarization method as claimed in claim 1, wherein the morphological transformation module includes a dilation module configured to dilate the human pixel positions which indicate the human location.

10. The crowd motion summarization method as claimed in claim 1, wherein the features are Kanade-Lucas-Tomasi (KLT) features, wherein the feature tracking information includes KLT feature tracking information, wherein the feature locations are KLT feature locations, wherein the generating the feature tracking information includes:
    generating, using a KLT feature extraction module and the video frame: a KLT feature map of KLT feature location of the KLT features detected in the video frame;
    generating, by element-wise multiplying of the KLT feature map with the binary crowd occupancy map: a filtered KLT feature map with only the KLT feature locations in the human pixel positions for the video frame;
    generating, using a KLT feature tracking module: a respective feature tracklet between the KLT feature location of each KLT feature and a previous KLT feature location detected from the previous video frame; and
    generating, using a speed and orientation estimator module and the respective feature tracklet: the feature tracking information for each KLT feature, including: KLT feature speed, and KLT feature orientation.

11. The crowd motion summarization method as claimed in claim 1, wherein the features are KLT features, and wherein the feature tracking information includes KLT feature tracking information.

12. The crowd motion summarization method as claimed in claim 1, wherein the generating using the feature-crowd matching module includes estimating a number of the features per human.

13. The crowd motion summarization method as claimed in claim 1:
    wherein the feature orientation for an $i^{th}$ feature is calculated as:

$$\theta^i = \arctan \frac{(y_n^i - y_{n-1}^i)}{(x_n^i - x_{n-1}^i)};$$

and
    wherein the feature speed for the $i^{th}$ feature is calculated as:

$$M^i = \sqrt{(x_n^i - x_{n-1}^i)^2 + (y_n^i - y_{n-1}^i)^2},$$

wherein (x, y) are Cartesian co-ordinates of the feature location for the $i^{th}$ feature, n is the video frame, and n−1 is the previous video frame.

14. The crowd motion summarization method as claimed in claim 1, further comprising:
receiving the previous video frame; and
generating, using the feature tracking module, for each previous feature detected in the previous video frame: the previous feature location.

15. The crowd motion summarization method as claimed in claim 14, further comprising:
generating, using the crowd occupancy detection module and the previous video frame: a previous binary crowd occupancy map of the previous video frame having the human pixel positions which indicate the human location versus the non-human location; and
wherein the generating the previous feature location is performed on only each feature in the human pixel positions of the previous binary crowd occupancy map for the previous video frame.

16. The crowd motion summarization method as claimed in claim 1, wherein the generating the binary crowd occupancy map uses the video frame without using any previous video frame or any previous binary crowd occupancy map.

17. The crowd motion summarization method as claimed in claim 1:
wherein the crowd occupancy detection module includes a crowd occupancy detection model; and
wherein the feature tracking module includes a feature tracking model.

18. The crowd motion summarization method as claimed in claim 1, wherein the method is performed by at least one processor.

19. A crowd motion summarization apparatus, comprising:
memory; and
at least one processor configured to execute instructions stored in the memory, to:
receive a video frame,
generate, using a crowd occupancy detection module and the video frame: a binary crowd occupancy map of the video frame having human pixel positions which indicate human location versus non-human location, and a total human count of humans detected in the video frame, the generating the binary crowd occupancy map including:
generating, using a crowd density estimating module and the video frame: a crowd density map which includes a probability of the human location,
generating, using a binary threshold module and the crowd density map: a threshold binary crowd occupancy map of the crowd density map for the probability that exceeds a threshold, the threshold binary crowd occupancy map having the human pixel positions which indicate the human location versus the non-human location, and
generating, using a morphological transformation module and the threshold binary crowd occupancy map: the binary crowd occupancy map from the threshold binary crowd occupancy map which accounts for morphological human features,
generate, using a feature tracking module and the video frame: a feature map including feature location of features detected in the video frame,
generate, using the feature tracking module, the feature map, the binary crowd occupancy map, the video frame, a previous video frame, and previous feature location of previous features detected from the previous video frame: feature tracking information for only each feature in the human pixel positions for the video frame, including: i) the feature location, ii) feature speed, iii) feature orientation, and iv) total feature count, and
generate, using a feature-crowd matching module, the feature tracking information, and the total human count: crowd motion data including: i) a human speed count of at least one human speed, ii) a human orientation count of at least one human orientation.

20. A non-transitory computer-readable medium including instructions executable by at least one processor, the instructions comprising:
instructions for receiving a video frame;
instructions for generating, using a crowd occupancy detection module and the video frame: a binary crowd occupancy map of the video frame having human pixel positions which indicate human location versus non-human location, and a total human count of humans detected in the video frame, the instructions for generating the binary crowd occupancy map including:
instructions for generating, using a crowd density estimating module and the video frame: a crowd density map which includes a probability of the human location,
instructions for generating, using a binary threshold module and the crowd density map: a threshold binary crowd occupancy map of the crowd density map for the probability that exceeds a threshold, the threshold binary crowd occupancy map having the human pixel positions which indicate the human location versus the non-human location, and
instructions for generating, using a morphological transformation module and the threshold binary crowd occupancy map: the binary crowd occupancy map from the threshold binary crowd occupancy map which accounts for morphological human features;
instructions for generating, using a feature tracking module and the video frame: a feature map including feature location of features detected in the video frame;
instructions for generating, using the feature tracking module, the feature map, the binary crowd occupancy map, the video frame, a previous video frame, and previous feature location of previous features detected from the previous video frame: feature tracking information for only each feature in the human pixel positions for the video frame, including: i) the feature location, ii) feature speed, iii) feature orientation, and iv) total feature count; and
instructions for generating, using a feature-crowd matching module, the feature tracking information, and the total human count: crowd motion data including: i) a human speed count of at least one human speed, ii) a human orientation count of at least one human orientation.

* * * * *